(12) United States Patent
Ohma et al.

(10) Patent No.: US 10,573,901 B2
(45) Date of Patent: Feb. 25, 2020

(54) CATALYST AND MANUFACTURING METHOD THEREOF, AND ELECTRODE CATALYST LAYER USING THE CATALYST

(71) Applicant: TANAKA KIKINZOKU KOGYO K.K., Tokyo (JP)

(72) Inventors: Atsushi Ohma, Yokohama (JP); Ken Akizuki, Nishitokyo (JP); Yoshitaka Ono, Atsugi (JP); Tetsuya Mashio, Yokohama (JP); Koichi Matsutani, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 14/786,056

(22) PCT Filed: Apr. 14, 2014

(86) PCT No.: PCT/JP2014/060634
§ 371 (c)(1),
(2) Date: Oct. 21, 2015

(87) PCT Pub. No.: WO2014/175097
PCT Pub. Date: Oct. 30, 2014

(65) Prior Publication Data
US 2016/0072134 A1    Mar. 10, 2016

(30) Foreign Application Priority Data
Apr. 25, 2013 (JP) .................................. 2013-092906

(51) Int. Cl.
*H01M 4/90* (2006.01)
*H01M 4/88* (2006.01)
(Continued)

(52) U.S. Cl.
CPC ......... *H01M 4/9075* (2013.01); *H01M 4/885* (2013.01); *H01M 4/8885* (2013.01);
(Continued)

(58) Field of Classification Search
None
See application file for complete search history.

(56) References Cited

U.S. PATENT DOCUMENTS 5,866,423 A    2/1999 Sugawara et al.
6,242,260 B1   6/2001 Sugawara et al.
(Continued)

FOREIGN PATENT DOCUMENTS

EP    1 852 180 A1    11/2007
EP    2 990 105 A1    3/2016
(Continued)

OTHER PUBLICATIONS

English translation of JP 2007250274 A—2007.*
(Continued)

*Primary Examiner* — Lucas J. O'Donnell
(74) *Attorney, Agent, or Firm* — Foley & Lardner LLP

(57) ABSTRACT

[Object] Provided is a catalyst having a high catalytic activity.
[Solving Means] Disclosed is a catalyst comprising a catalyst support and a catalyst metal supported on the catalyst support, wherein the catalyst support includes pores having a radius of less than 1 nm and pores having a radius of 1 nm or more, a surface area formed by the pores having a radius of less than 1 nm is equal to or larger than a surface area formed by the pores having a radius of 1 nm or more, and an average particle diameter of the catalyst metal is 2.8 nm or more.

11 Claims, 4 Drawing Sheets

(51) Int. Cl.
*H01M 4/92* (2006.01)
*H01M 8/1018* (2016.01)

(52) U.S. Cl.
CPC ........... *H01M 4/9083* (2013.01); *H01M 4/92* (2013.01); *H01M 4/925* (2013.01); *H01M 4/926* (2013.01); *H01M 4/8892* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 6,277,513 | B1 | 8/2001 | Swathirajan et al. |
| 6,398,858 | B1 | 6/2002 | Yu et al. |
| 6,812,187 | B1 | 11/2004 | Pak et al. |
| 8,114,372 | B2 * | 2/2012 | Pak .................. B01J 21/18 423/414 |
| 9,156,694 | B2 | 10/2015 | Morishita |
| 2002/0019308 | A1 | 2/2002 | Hitomi et al. |
| 2003/0045425 | A1 * | 3/2003 | Ruth .................. B01J 21/18 502/325 |
| 2003/0104936 | A1 | 6/2003 | Mao et al. |
| 2003/0108481 | A1 | 6/2003 | Igarashi et al. |
| 2004/0131919 | A1 * | 7/2004 | Yasumoto ........... H01M 4/8605 429/490 |
| 2004/0248730 | A1 | 12/2004 | Kim et al. |
| 2005/0095456 | A1 | 5/2005 | Takeda |
| 2005/0227862 | A1 | 10/2005 | Cao et al. |
| 2005/0282061 | A1 | 12/2005 | Campbell |
| 2006/0051657 | A1 | 3/2006 | Terada et al. |
| 2006/0093893 | A1 | 5/2006 | Matsuo et al. |
| 2006/0099139 | A1 * | 5/2006 | Webster Long ........ C01B 31/00 423/567.1 |
| 2006/0105232 | A1 | 5/2006 | Tanuma |
| 2007/0122334 | A1 * | 5/2007 | Pak .................. B01J 21/18 423/445 R |
| 2007/0224479 | A1 | 9/2007 | Takokoro et al. |
| 2008/0145733 | A1 | 6/2008 | Asazawa et al. |
| 2008/0182745 | A1 | 7/2008 | Finkelshtain et al. |
| 2008/0207442 | A1 | 8/2008 | Pfeifer et al. |
| 2009/0047559 | A1 | 2/2009 | Terada et al. |
| 2010/0092830 | A1 * | 4/2010 | Hayashi .................. H01M 4/90 429/481 |
| 2011/0058308 | A1 | 3/2011 | Nishi et al. |
| 2011/0097583 | A1 * | 4/2011 | Tenninson ............... B01J 21/18 428/402 |
| 2011/0223494 | A1 | 9/2011 | Feaver et al. |
| 2011/0318254 | A1 | 12/2011 | Morishita |
| 2012/0100461 | A1 * | 4/2012 | Iden ................... H01M 4/8605 429/516 |
| 2012/0149545 | A1 | 6/2012 | Takahashi et al. |
| 2013/0244137 | A1 | 9/2013 | Tada et al. |
| 2014/0199609 | A1 | 7/2014 | Iden et al. |
| 2014/0205929 | A1 | 7/2014 | Mashio et al. |
| 2014/0287344 | A1 | 9/2014 | Suzue et al. |
| 2015/0352522 | A1 | 12/2015 | Mizuuchi et al. |
| 2016/0072134 | A1 | 3/2016 | Ohma et al. |
| 2017/0244125 | A1 | 8/2017 | Takahashi et al. |
| 2017/0331134 | A1 | 11/2017 | Iden et al. |

FOREIGN PATENT DOCUMENTS

| | | |
|---|---|---|
| EP | 2 990 109 A1 | 3/2016 |
| JP | 61-050639 A | 3/1986 |
| JP | 05-345130 A | 12/1993 |
| JP | 06-196171 A | 7/1994 |
| JP | 09-257687 A | 10/1997 |
| JP | 2001-157841 A | 6/2001 |
| JP | 2001-300324 A | 10/2001 |
| JP | 2003-201417 A | 7/2003 |
| JP | 2004-025024 A | 1/2004 |
| JP | 2004-217507 A | 8/2004 |
| JP | 2005-135817 A | 5/2005 |
| JP | 2005-515063 A | 5/2005 |
| JP | 2006-155921 A | 6/2006 |
| JP | 2006-156154 A | 6/2006 |
| JP | 2007-220384 A | 8/2007 |
| JP | 2007-250274 A | 9/2007 |
| JP | 2007-532288 A | 11/2007 |
| JP | 2008-517750 A | 5/2008 |
| JP | 2008-269850 A | 11/2008 |
| JP | 2009-035598 A | 2/2009 |
| JP | 2010-015970 A | 1/2010 |
| JP | 2010-208887 A | 9/2010 |
| JP | 2011-119209 A | 6/2011 |
| JP | 4715842 B2 | 7/2011 |
| JP | 2012-124001 A | 6/2012 |
| JP | 2012-174623 A | 9/2012 |
| JP | 2013-109856 A | 6/2013 |
| JP | 2013-131420 A | 7/2013 |
| WO | WO-2005/083818 A1 | 9/2005 |
| WO | WO 2006/045606 A1 | 5/2006 |
| WO | WO 2009/075264 A1 | 6/2009 |
| WO | WO-2010/143311 A1 | 12/2010 |
| WO | WO-2012/053638 A1 | 4/2012 |
| WO | WO-2012/077598 A1 | 6/2012 |
| WO | WO-2013/027627 A1 | 2/2013 |
| WO | WO-2014/129597 A1 | 8/2014 |
| WO | WO-2014/175098 A1 | 10/2014 |
| WO | WO-2014/175107 A1 | 10/2014 |

OTHER PUBLICATIONS

Ordered Hierarchical Nanostructured Carbon as a Highly Efficient Cathode Catalyst Support in Proton Exchange Membrane Fuel CellBaizeng Fang, Jung Ho Kim, Minsik Kim, and Jong-Sung YuChemistry of Materials 2009 21 (5), 789-796 (Year: 2009).*
Xu, Fan et al. "Investigation of the Carbon Corrosion Process for Polymer Electrolyte Fuel Cells Using a Rotating Disk Electrode Technique" (2010). Birck and NCN Publications. Paper 652. http://dx.doi.org/10.1149/1.3435272 (Year: 2010).*
U.S. Appl. No. 14/786,470, filed Oct. 22, 2015, Nissan Motor Co., Ltd., et al.
U.S. Appl. No. 14/786,281, filed Oct. 22, 2015, Nissan Motor Co., Ltd., et al.
U.S. Appl. No. 14/786,632, filed Oct. 23, 2015, Nissan Motor Co., Ltd., et al.
U.S. Appl. No. 14/786,479, filed Oct. 22, 2015, Nissan Motor Co., Ltd.
U.S. Appl. No. 14/786,675, filed Oct. 23, 2015, Nissan Motor Co., Ltd.
Environment Conscious New Material Series, Fuel Cell Material, published by Nikkan Kogyo Shimbum Ltd., 2007, 1$^{st}$ Edition, pp. 109-111.
"Vulcan XC72R," Cabot Corporation, URL:http://search.proquest.com/docview/884297145, Nov. 30, 2002.
Antolini et al., Carbon Supports for Low-Temperature Fuel Cell Catalysts, Applied Catalysis B: Environmental, vol. 88, No. 1-2, Apr. 29, 2009, pp. 1-24.
Wang et al: "Investigation of carbon corrosion in polymer electrolyte fuel cells using steam etching," Materials Chemistry and Physics, Switzerland, Oct. 1, 2010, vol. 123, No. 2-3, pp. 761-766.
Ma et al. F NMR Studies of Nation Ionomer Adsorption on PEMFC Catalysts and Supporting Carbons. Solid Stat Ionic. vol. 178. Issue 29-30. Dec. 2007, pp. 1568-1575.
Soboleva, T. et al., "On the Micro~, Meso~, and Macroporous Structures of Polymer Electrolyte Membrane Fuel Cell Catalyst Layers", ACS Applied Materials and Interfaces, vol. 2, No. 2, (Feb. 24, 2010), pp. 375-384.
Subbaraman et al., Three Phase Interfaces at Electrified Metal-Solid Electrolyte System 1. Study of the Pt(hkl)-Nafion Interface, J Phys Chem C 2010, 114 (18), pp. 8414-8422.
USPTO Office Action, U.S. Appl. No. 14/786,479, dated Jun. 4, 2018, 10 pages.
USPTO Office Action, U.S. Appl. No. 14/786,675, dated Jun. 1, 2018, 8 pages.
USPTO Office Action, U.S. Appl. No. 15/522,023, dated May 3, 2018, 20 pages.

(56) References Cited

OTHER PUBLICATIONS

Vol'fkovich, Yu. M, et al., Porous Structure of the Catalyst Layers of Electrodes in a Proton-Exchange Membrane Fuel Cell: A Stage-by-Stage Study, Russian Journal of Electrochemistry, vol. 46, No. 3, (Mar. 2010), pp. 336-344.
Xiaoming Ren et al., Oxygen Reduction Reaction Catalyst on Lithium/Air Battery Discharge Performance, Journal of Materials Chemistry, Vo. 21, No. 27, Jan. 1, 2011, pp. 10118-10125.
Xue Liu et al., "Graphene supported platinum nanoparticles as anode electrocatalyst for direct borohydride fuel cell," International Journal of Hydrogen Energy, vol. 37, No. 23, Dec. 1, 2012, pp. 17984-17991, XP055410279.
European Extended Search Report, dated Oct. 6, 2017, 11 pages.
USPTO Office Action, U.S. App. No. 15/522,023, dated Oct. 9, 2018, 11 pages.
USPTO Office Action, U.S. Appl. No. 14/786,479, dated Oct. 17, 2018, 16 pages.
USPTO Notice of Allowance, U.S. Appl. No. 15/522,023, dated Mar. 4, 2019, 13 pages.
USPTO Office Action, U.S. Appl. No. 14/786,675, dated Jun. 13, 2019, 20 pages.
USPTO Office Action, U.S. Appl. No. 14/786,675, dated Nov. 26, 2018, 8 pages.
USPTO Office Action, U.S. Appl. No. 14/786,479, dated May 2, 2019, 11 pages.
USPTO Notice of Allowance, U.S. Appl. No. 14/786,479, dated Aug. 21, 2019, 8 pages.
USPTO Office Action, U.S. Appl. No. 14/786,675, dated Nov. 29, 2019, 8 pages.

* cited by examiner

CATALYST AND MANUFACTURING METHOD THEREOF, AND ELECTRODE CATALYST LAYER USING THE CATALYST

TECHNICAL FIELD

The present invention relates to a catalyst, particularly, an electrode catalyst used for a fuel cell (PEFC) and a manufacturing method thereof, and an electrode catalyst layer using the catalyst.

BACKGROUND ART

A polymer electrolyte fuel cell using a proton conductive solid polymer membrane operates at a low temperature in comparison to other types of fuel cells, for example, a solid oxide fuel cell or a molten carbonate fuel cell. For this reason, the polymer electrolyte fuel cell has been expected to be used as a power source for energy storage system or a driving power source for a vehicle such as a car, and practical uses thereof have been started.

In general, such a polymer electrolyte fuel cell uses expensive metal catalyst represented by platinum (Pt) or a Pt alloy, which leads to high cost of the fuel cell. Therefore, development of techniques capable of lowering the cost of the fuel cell by reducing a used amount of noble metal catalyst has been required.

For example, Patent Literature 1 discloses an electrode catalyst having catalyst metal particles supported on a conductive support, wherein an average particle diameter of the catalyst metal particles is larger than an average pore diameter of fine pores of the conductive supports. It discloses that, according to the above-described configuration, the catalyst particles are not allowed to enter the fine pores of the supports, so as to increase a ratio of the catalyst particles used in a three phase boundary, and thus, to improve use efficiency of expensive noble metal.

CITATION LIST

Patent Literature

Patent Literature 1: JP-A-2007-250274 (US 2009/0047559 A1)

SUMMARY OF INVENTION

However, the catalyst disclosed in the Patent Literature 1 has problems in that the catalyst metal particles are desorbed under a mechanical stress, a portion of introduced platinum is not effectively used, and catalytic activity is decreased.

The present invention has been made in light of the aforementioned circumstances and aims at providing a catalyst having a high catalytic activity.

Another object of the present invention is to provide an electrode catalyst layer, a membrane electrode assembly, and a fuel cell having an excellent power generation performance.

The present inventors have intensively studied to solve the aforementioned problems, to find that the problems can be solved by supporting catalyst particles having a specific size on a catalyst support having a specific pore distribution, and eventually the present invention has been completed.

DESCRIPTION OF EMBODIMENTS

Figure 1:
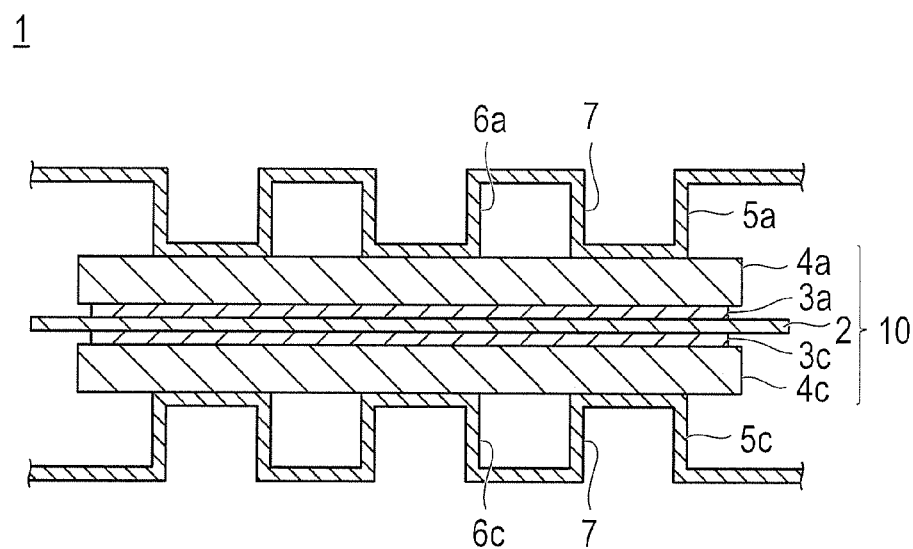
FIG. 1 is a schematic cross-sectional diagram illustrating a basic configuration of a polymer electrolyte fuel cell according to an embodiment of the present invention.

A catalyst (in this description, also referred to as an "electrode catalyst") of the present invention is configured to comprise a catalyst support and a catalyst metal supported on the catalyst support. Herein, the catalyst satisfies the following features (a) to (c):

(a) the catalyst support contains pores (primary pores) having a radius of less than 1 nm and pores (primary pores) having a radius of 1 nm or more;

(b) the surface area formed by the pores having a radius of less than 1 nm is equal or larger than the surface area formed by the pores having a radius of 1 nm or more; and (c) the average particle diameter of the catalyst metals is 2.8 nm or more.

According to the catalyst having the above-described features, the catalyst metal is placed in a relatively large pore, and a relatively small pore can prevent the placed catalyst metal from being detached under a mechanical stress. As a result, a reaction activity of the catalyst can be improved. In this description, a pore having a radius of less than 1 nm is referred to as "micropore". Also, in this description, a pore having a radius of 1 nm or more is referred to as "mesopore".

The present inventors have found that, in the catalyst disclosed in the Patent Literature 1, since a catalyst metal particles exist on an outer surface of conductive support or around an entrance of fine pore, if various mechanical stresses such as a shear force or a centrifugal force are exerted during the manufacturing of electrode (catalyst layer), the catalyst metal particle is detached from the surface of the support. On the contrary, the present inventors have found that, by setting a surface area formed by micropores of catalyst support to be equal to or larger than a surface area formed by mesopores and setting an average particle diameter of catalyst metals to be 2.8 nm or more, the catalyst metal can be suppressed and prevented from being detached from the support even under a mechanical stress. Although not clear, the reason for achieving the above-described effect is presumed as follows. The present invention is not limited by the following presumption. Namely, according to the above-described feature (b), there exist a large number of micropores having a pore diameter in the catalyst support smaller than a particle diameter of the catalyst metal. In addition, most of the catalyst metals exist inside the mesopores but not on the surfaces of the catalyst support. Therefore, although various mechanical stresses (for example, shear force or centrifugal force) are exerted during the transporting of catalyst or during the manufacturing of electrode, the catalyst metals existing in the mesopores are hardly detached outside (from the catalyst support). In addition, since the size (pore radius) of the micropores existing in the vicinity of the surface of the catalyst support from the catalyst metal is significantly smaller than that of the catalyst metal, the catalyst metals can be more effectively suppressed and prevented from being detached outside (from the catalyst supports) under the mechanical stress. Therefore, the catalyst can be more effectively used.

In addition, the present inventors have found that, even in the case where a catalyst is not in contact with an electrolyte, the catalyst forms a three-phase boundary with a gas (for example, oxygen) and water, so that the catalyst can be effectively used, and thus, the non-contact case can be effectively used. Therefore, the catalytic activity can be improved by taking the feature (c) where the catalyst metals are supported inside the mesopores which the electrolyte cannot enter.

On the other hand, in the case where the catalyst metals are supported inside the mesopores which the electrolyte cannot enter, a transporting distance of a gas such as oxygen is increased, and thus, gas transportability is deteriorated. Therefore, a sufficient catalytic activity cannot be exhibited, and catalyst performance is deteriorated under high load conditions. On the contrary, by securing a sufficient pore volume of the micropores in the feature (b), a as such as oxygen can be efficiently transported to the catalyst in the mesopores, and namely, as transport resistance can be reduced. Therefore, due to this feature, a as (for example, oxygen) can pass through the micropores (gas transportability is improved), and the as may be allowed to be efficiently in contact with the catalyst.

Therefore, according to the present invention, since the micropores exist with a large volume, the catalyst can be more effectively utilized, namely, the catalytic activity can be improved. In addition, according to the present invention, since a reaction gas can be transported through the micropores (paths) to a surface of catalyst metal existing in the mesopore, as transport resistance can decrease. Therefore, the catalyst according to the present invention can exhibit a high catalytic activity, and namely, the catalyst reaction can be facilitated. For this reason, the membrane electrode assembly and fuel cell comprising the catalyst layer using the catalyst according to the present invention have an excellent power generation performance.

Hereinafter, embodiments of a catalyst according to the present invention and embodiments of a catalyst layer, and a membrane electrode assembly (MEA) and a fuel cell using the catalyst will be described in detail appropriately with reference to the drawings. However, the present invention is not limited to the following embodiments. In addition, figures may be expressed in an exaggerated manner for the convenience of description, and in the figures, scaling factors of components may be different from actual values thereof. In addition, in the description of the embodiments of the present invention with reference to the drawings, the same components are denoted by the same reference numerals, and redundant description is omitted.

In this description, "X to Y" representing a range denotes "X or more and Y or less", and "weight" and "mass", "wt % and "mass %", "parts by weight", and "parts by mass" are used interchangeably. Unless otherwise noted, operation and the measurement of physical properties are performed at a room temperature (20 to 25° C.) and a relative humidity of 40 to 50%.

[Fuel Cell]

A fuel cell comprises a membrane electrode assembly (MEA) and a pair of separators including an anode-side separator having a fuel gas passage through which a fuel gas flows and a cathode-side separator having an oxidant gas passage through which an oxidant gas flows. The fuel cell according to the present invention has excellent durability and can exhibit a high power generation performance.

FIG. 1 is a schematic diagram illustrating a basic configuration of a polymer electrolyte fuel cell (PEFC) 1 according to an embodiment of the present invention. First, a PEFC 1 is configured to comprise a solid polymer electrolyte membrane 2 and a pair of catalyst layers (anode catalyst layer 3a and cathode catalyst layer 3c) interposing the solid polymer electrolyte membrane 2. A stacked body of the solid polymer electrolyte membrane 2 and the catalyst layers (3a, 3c) is sandwiched by a pair of gas diffusion layers (GDLs) (anode gas diffusion layer 4a and cathode gas diffusion layer 4c). In this manner, the solid polymer electrolyte membrane 2, a pair of the catalyst layers (3a, 3c), and a pair of gas diffusion layers (4a, 4c) in the stacked state constitute a membrane electrode assembly (MEA) 10.

In the PEFC 1, the MEA 10 is sandwiched by a pair of separators (anode separator 5a and cathode separator 5c). In FIG. 1, the separators (5a, 5c) are illustrated to be positioned at two ends of the MEA 10 illustrated. In general, in a fuel cell stack where a plurality of MEAs are stacked, the separator is also used as a separator for adjacent PEFC (not shown). In other words, MEAs in a fuel cell stack are sequentially stacked through the separator to constitute the stack. In an actual fuel cell stack, a gas sealing member is disposed between the separators (5a, 5c) and the solid polymer electrolyte membrane 2 and between the PEFC 1 and a different PEFC adjacent thereto. However, it is omitted in FIG. 1.

The separators (5a, 5c) are obtained by applying a pressing process to a thin board having a thickness of, for example, 0.5 mm or less to form a corrugating shape illustrated in FIG. 1. Convex portions of the separators 5a and 5c seen from the MEA side are in contact with the MEA 10. This secures an electrical connection with the MEA 10. Concave portions (spaces between the separator and the MEA formed by the corrugating shapes of the separators) of the separators (5a and 5c) seen from the MEA side function as a gas passage for passing a gas during the operation of the PEFC 1. Specifically, a fuel gas (for example, hydrogen) flows through a gas passage 6a of the anode separator 5a, and an oxidant gas (for example, air) flows through a gas passage 6c of the cathode separator 5c.

On the other hand, concave portions of the separators (5a, 5c) seen from the side opposite to the MEA side function as a coolant passage 7 for passing a coolant (e.g. water) for cooling the PEFC during the operation of the PEFC 1. In addition, manifolds (not shown) are typically installed in the separators. The manifold functions as a connecting means for connecting cells when the stack is configured. According to the configuration, a mechanical strength of the fuel cell stack can be secured.

In the embodiment illustrated in FIG. 1, each of the separators (5a, 5c) is formed in a corrugating shape. However, the separator is not limited to such a corrugating shape. If it can serve as a gas passage and a coolant passage, arbitrary shape such as a flat shape and a partially corrugating shape may be employed.

The fuel cell including the MEA according to the present invention as described above has excellent performance of power generation. Herein, the type of the fuel cell is not particularly limited. In the above description, the polymer electrolyte fuel cell is exemplified, but besides, an alkali fuel cell, a direct methanol fuel cell, a micro fuel cell, and the like may be exemplified. Among the fuel cells, due to a small size and capability of obtaining high density and high power, a polymer electrolyte fuel cell (PEFC) is preferred. In addition, the fuel cell is useful as a power source for energy storage system besides a power source for a vehicle such as a car where a mounting space is limited. Among the power sources, the fuel cell is particularly preferably used as a power source for a vehicle such as a car where a high output voltage is required after the stopping of operation for a relatively long time.

A fuel used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol, or the like can be used. Among them, in view of capability of high output, hydrogen or methanol is preferably used.

In addition, although application use of the fuel cell is not particularly limited, the fuel cell is preferably applied to vehicles. The electrolyte membrane-electrode assembly according to the present invention has excellent power generation performance and durability, and can be downsized. Therefore, in terms of mountability on a vehicle, the fuel cell according to the present invention is particularly advantageous in the case where the fuel cell is applied to a vehicle.

Hereinafter, members constituting the fuel cell according to the present invention will be described in brief, but the scope of the present invention is not limited only to the following forms.

[Catalyst (Electrode Catalyst)]

Figure 2:
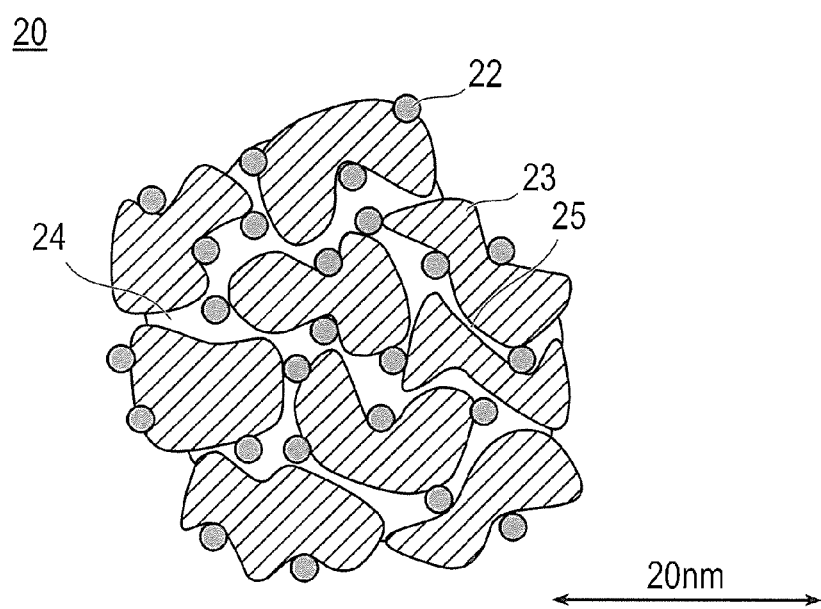
FIG. 2 is a schematic cross-sectional diagram illustrating a shape and a structure of a catalyst according to an embodiment of the present invention.

FIG. 2 is a schematic cross-sectional diagram illustrating a shape and a structure of a catalyst according to an embodiment of the present invention. As illustrated in FIG. 2, a catalyst 20 according to the present invention is configured to comprise a catalyst support 23 and catalyst metals 22 supported on the catalyst support 23. The catalyst 20 has pores (micropores)) 25 having a radius of less than 1 nm and pores (mesopores) 24 having a radius of 1 nm or more. The micropores 25 and the mesopores 24 can be formed by an assembly of a plurality of supports 23. The catalyst metal(s) 22 is supported inside the mesopore 24. In addition, at least a portion of the catalyst metals 22 may be supported inside the mesopore 24, and other portions thereof may be supported on the surface of the support 23. However, in terms of preventing the contact of the electrolyte with the catalyst metal, substantially all the catalyst metals 22 are preferably supported inside the mesopores 24. As used herein, the expression "substantially all the catalyst metals" is not particularly limited if an amount which can improve a sufficient catalytic activity can be attained. The amount of "substantially all the catalyst metals" is preferably 50 wt % or more (upper limit: 100 wt %), more preferably 80 wt % or more (upper limit: 100 wt %), with respect to all the catalyst metals.

Figure 3:
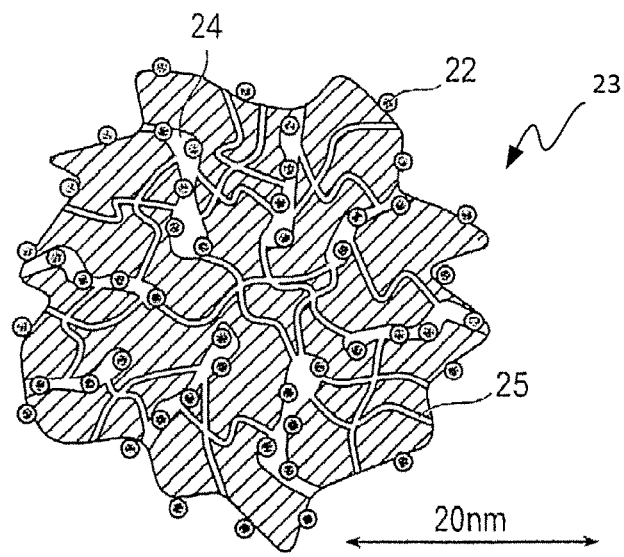
FIG. 3 is a schematic cross-sectional diagram illustrating a shape and a structure of a catalyst according to another embodiment of the present invention.

In FIG. 2, the micropores 25 and mesopores 24 are formed in the catalyst 20 by the assembly of the supports 23. However, the present invention is not limited to the above-described form. For example, as illustrated in FIG. 3, desired micropores 25 and mesopores 24 may be formed in one support 23.

In this description, the state "the catalyst metals are supported inside the mesopores" can be confirmed by a decrease in volume of mesopores before and after the supporting of catalyst metals on a support. Specifically, a support contains micropores and mesopores, and the pores have the respective certain volumes. If catalyst metals are supported in the pore(s), the volumes of the pores are decreased. Therefore, the case where a difference between a volume of mesopores of a catalyst (support) before the supporting of catalyst metals and a volume of mesopores of a catalyst (support) after the supporting of catalyst metals [=(volume before supporting)−(volume after supporting)] exceeds 0 indicates that "the catalyst metals are supported inside the mesopore(s)". Similarly, the case where a difference between a volume of micropores of a catalyst (support) before the supporting of catalyst metals and a volume of micropores of a catalyst (support) after the supporting of catalyst metals [=(volume before supporting)−(volume after supporting)] exceeds 0 indicates that "the catalyst metals are supported inside the micropore(s)". Preferably, a larger number of catalyst metals are supported in mesopores than in micropores (namely, (decreased volume of mesopores before and after the supporting)>(decreased volume of micropores before and after the supporting)). By this, gas transport resistance can be reduced and a path for gas transportation can be sufficiently secured. In terms of reduced gas transport resistance and securing of a path for gas transportation, a decreased pore volume of mesopores before and after the supporting of the catalyst metals is preferably 0.02 cc/g or more, more preferably in the range of 0.02 to 0.21 cc/g.

The catalyst support satisfies a relationship that a surface area formed by pores (micropores) having a radius of less than 1 nm is equal to or larger than a surface area formed by pores (mesopores) having a radius of 1 nm or more (that is, (surface area formed by micropores) (surface area formed by mesopores)). Due to of a large number of micropores in the support, even in the case where various types of mechanical stresses (for example, shear force or centrifugal force) is exerted during the catalyst transport or during the electrode manufacturing, catalyst metals existing in the mesopores can be suppressed and prevented from being detached outside (from the catalyst support). A difference between a surface area formed by micropores and a surface area formed by mesopores [=(surface area formed by micropores)−(surface area formed by mesopores)] is not particularly limited, but is preferably in the range of 50 to 2000 $m^2$/g support, more preferably in the range of 200 to 2000 $m^2$/g support. Within such a surface area difference, catalyst metals can be more effectively suppressed and prevented from being detached under a mechanical stress. In addition, since a pore volume of micropores can be sufficiently secured, a gas transport path can be sufficiently secured. Therefore, a gas such as oxygen can be efficiently transported to a catalyst metal in a mesopore, and in other words, gas transport resistance can be reduced.

A pore distribution of catalyst support is not particularly limited so long as it satisfy the relationship between a surface area formed by micropores and a surface area formed by mesopores.

For example, a surface area formed by pores (micropores) having a radius of less than 1 nm [surface area of micropores of support per 1 g of support ($m^2$/g support)] is not particularly limited, but is preferably in the range of 200 to 2500 $m^2$/g support. The surface area formed by the micropores is particularly preferably in the range of 500 to 2500 $m^2$/g support. If the pore volume is within such a range, the catalyst metals can be more effectively suppressed and prevented from being detached under a mechanical stress. In addition, since enough micropores to perform the gas transport can be secured, gas transport resistance becomes small. Therefore, since a sufficient amount of a gas can be transported to a surface of catalyst metal(s) existing in a mesopore(s) through a micropore(s) (path(s)), the catalyst according to the present invention can exhibit a high catalytic activity, and namely, the catalyst reaction can be facilitated. In addition, an electrolyte (ionomer) or a liquid (for example, water) cannot enter a micropore, and only a gas can selectively pass through the micropore(s) (gas transport resistance can be reduced). In this description, a surface area formed by pores (micropores) having a radius of less than 1 nm is also simply referred to as a "surface area by micropores".

In addition, a surface area formed by pores (mesopores) having a radius of 1 nm or more [surface area of mesopores of support per 1 g of support ($m^2$/g support)] is not particularly limited so long as it be equal or smaller than a surface area formed by micropores. The surface area formed by mesopores is particularly preferably in the range of 150 to 1000 $m^2$/g support. If the pore volume is within such a range, the catalyst metals can be more effectively suppressed and prevented from being detached under a mechanical stress. In addition, since a large number of the catalyst metals can be placed (supported) in the mesopores, an electrolyte and catalyst metals in the catalyst layer can be physically separated from each other (contact between catalyst metals and an electrolyte can be more effectively suppressed and prevented). Therefore, activity of the catalyst metals can be more effectively used. Also, due to existence of a large number of the mesopores, the function and effects by the present invention can be further remarkably exhibited, so that a catalyst reaction can be more effectively facilitated. In addition, a micropore(s) functions as a gas transport path, and thus, a three-phase boundary with water is more remarkably formed, so that catalytic activity can be more improved. In this description, a surface area formed by pores (mesopores) having a radius of 1 nm or more is also simply referred to as a "surface area by mesopores".

Although a pore volume of pores (micropores) having a radius of less than 1 nm of the catalyst support is not particularly limited, it is preferably 0.1 cc/g support or more. The pore volume of the micropores is more particularly in the range of 0.3 to 3 cc/g support, particularly preferably in the range of 0.4 to 2 cc/g support. If the pore volume is within such a range, the catalyst metals can be more effectively suppressed and prevented from being detached under a mechanical stress. In addition, since enough micropores to perform the gas transport can be secured, gas transport resistance becomes small. Therefore, since a sufficient amount of a gas can be transported to a surface of catalyst metal(s) existing in a mesopore(s) through a micropore(s) (path(s)), the catalyst according to the present invention can exhibit a high catalytic activity, and namely, the catalyst reaction can be facilitated. In addition, an electrolyte (ionomer) or a liquid (for example, water) cannot enter a micropore, and only a gas can selectively pass through the micropore(s) (gas transport resistance can be reduced). In this description, a pore volume of pores having a radius of less than 1 nm is simply referred as a "pore volume of micropores".

In addition, a pore volume of pores (mesopores) having a radius of 1 nm or more of the catalyst support is not particularly limited, but it is preferably 0.4 cc/g support or more, more preferably in the range of 0.4 to 3 cc/g support, particularly preferably in the range of 0.4 to 2 cc/g support. If the pore volume is within such a range, the catalyst metals can be more effectively suppressed and prevented from being detached under a mechanical stress. In addition, since a large number of the catalyst metals can be placed (supported) in the mesopores, an electrolyte and catalyst metals in the catalyst layer can be physically separated from each other (contact between catalyst metals and an electrolyte can be more effectively suppressed and prevented). Therefore, activity of the catalyst metals can be more effectively used. Also, due to existence of a large number of the mesopores, the function and effects by the present invention can be further remarkably exhibited, so that a catalyst reaction can be more effectively facilitated. In addition, a micropore(s) functions as a gas transport path, and thus, a three-phase boundary with water is more remarkably formed, so that catalytic activity can be more improved. In this description, a pore volume of pores having a radius of 1 nm or more is simply referred to as a "pore volume of the mesopores".

A BET specific surface area of the catalyst support [BET specific surface area of catalyst per 1 g of support ($m^2$/g support)] is not particularly limited, but is 1000 $m^2$/g support or more, more preferably in the range of 1000 to 3000 $m^2$/g support, particularly preferably in the range of 1100 to 1800 $m^2$/g support. The pores of the catalyst support are preferably configured to consist only of micropores and mesopores. In this case, the BET specific surface area of the catalyst support is a sum of the surface area formed by micropores and the surface area formed by mesopores. If the specific surface area is within the above-described range, since sufficient mesopores and micropores can be secured, enough micropores to perform the gas transport (lower gas transport resistance) can be secured, and a larger number of the catalyst metals can be placed (supported) in the mesopores. In addition, an electrolyte and catalyst metals in the catalyst layer can be physically separated from each other (contact between catalyst metals and an electrolyte can be more effectively suppressed and prevented). Therefore, activity of the catalyst metals can be more effectively used. Also, due to existence of a large number of the micropores and mesopores, the function and effects by the present invention can be further remarkably exhibited, so that a catalyst reaction can be more effectively facilitated. Further, balance between dispersibility of catalyst component and availability of catalyst component on a catalyst support can be appropriately controlled. In addition, the micropores function as a gas transport path, and thus, a three-phase boundary with water is more remarkably formed, so that the catalytic activity can be more improved.

In this description, the "surface area ($m^2$/g support)" and the "BET specific surface area ($m^2$/g support)" are measured by a nitrogen adsorption method. Specifically, about 0.04 to 0.07 g of a sample (catalyst powder or catalyst support) is accurately weighed and sealed in a sample tube. The sample tube is preliminarily dried in a vacuum drier at 90° C. for several hours, to obtain a sample for measurement. For the weighing, an electronic balance (AW220) produced by Shimadzu Co., Ltd. is used. In the case of a coated sheet, about 0.03 to 0.04 g of a net weight of a coat layer obtained by subtracting a weight of Teflon (registered trademark) (substrate) having the same area from a total weight of the coated sheet is used as a sample weight. Next, under the following measurement condition, a BET specific surface area is measured. In an adsorption side of adsorption and desorption isotherms, a BET plot is produced from a relative pressure (P/P0) range of about 0.00 to 0.45, and a surface area and a BET specific surface area are calculated from the slope and the intercept.

[Chem. 1]
<Measurement Conditions>
Measurement Apparatus: BELSORP 36, High—Precise Automatic Gas Adsorption Apparatus produced by BEL Japan, Inc.
Adsorption Gas: $N_2$
Dead Volume Measurement Gas: He
Adsorption Temperature: 77 K (Liquid Nitrogen Temperature)
Measurement Preparation: Vacuum Dried at 90° C. for several hours (After He Purging, Set on Measurement Stage)
Measurement Mode: Adsorption Process and Desorption Process in Isotherm
Measurement Relative Pressure $P/P_0$: about 0 to 0.99
Equilibrium Setting Time: 180 sec for 1 relative pressure The "pore radius (nm) of micropores" denotes a radius of pores measured by a nitrogen adsorption method (MP method). In addition, the "mode radius (nm) of a pore distribution of micropores" denotes a pore radius at a point taking a peak value (maximum frequency) in a differential pore distribution curve obtained by a nitrogen adsorption method (MP method). Herein, a lower limit of the pore radius of micropores is a lower limit value which can be measured by the nitrogen adsorption method, that is, 0.42 nm or more. Similarly, the "pore radius (nm) of mesopores" denotes a radius of pores measured by a nitrogen adsorption method (DH method). In addition, the "mode radius (nm) of a pore distribution of mesopores" denotes a pore radius at a point taking a peak value (maximum frequency) in a differential pore distribution curve obtained by a nitrogen adsorption method (DH method). Herein, an upper limit of the pore radius of mesopores is not particularly limited, but it is 10 nm or less, preferably 5 nm or less.

The "pore volume of micropores" denotes a total volume of micropores having a radius of less than 1 nm existing in a catalyst, and is expressed by volume per 1 g of support (cc/g support). The "pore volume (cc/g support) of micropores" is calculated as an area (integration value) under a differential pore distribution curve obtained according to a nitrogen adsorption method (MP method). Similarly, the "pore volume of mesopores" denotes a total volume of mesopores having a radius of 1 nm or more existing in a catalyst, and is expressed by volume per 1 g of support (cc/g support). The "pore volume (cc/g support) of mesopores" is calculated as an area (integration value) under a differential pore distribution curve obtained according to a nitrogen adsorption method (DH method).

The "differential pore distribution" is a distribution curve obtained by plotting a pore diameter in the horizontal axis and a pore volume corresponding to the pore diameter in a catalyst in the vertical axis. Namely, when a pore volume of a catalyst obtained by a nitrogen adsorption method (MP method in case of the micropores; and DH method in case of the mesopores) is denoted by V and a pore diameter is denoted by D, a value $(dV/d(\log D))$ is obtained by dividing the differential pore volume dV by a differential logarithm $d(\log D)$ of the pore diameter. Next, a differential pore distribution curve is obtained by plotting the $dV/d(\log D)$ for an average pore diameter in each section. A differential pore volume dV denotes an increment of pore volume between measurement points.

A method for measuring a radius and a pore volume of micropores by a nitrogen adsorption method (MP method) is not particularly limited. For example, methods disclosed in well-down literatures such as "Science of Adsorption" (second edition written by Kondo Seiichi, Ishikawa Tatsuo, and Abe Ikuo, Maruzen Co., Ltd.), "Fuel Cell Analysis Method" (compiled by Takasu Yoshio, Yoshitake Yu, and Ishihara Tatsumi of KAGAKU DOJIN), and an article written by R. Sh. Mikhail, S. Brunauer, and E. E. Bodor in J. Colloid Interface Sci., 26, 45 (1968) may be employed. In this description, the radius and pore volume of micropores by a nitrogen adsorption method (MP method) are a value measured by the method disclosed in the article written by R. Sh. Mikhail, S. Brunauer, and E. E. Bodor in J. Colloid Interface Sci., 26, 45 (1968).

A method for measuring a radius and a pore volume of mesopores by a nitrogen adsorption method (DH method) is not particularly limited. For example, methods disclosed in well-known literatures such as "Science of Adsorption" (second edition written by Kondo Seiichi, Ishikawa Tatsuo, and Abe Ikuo, Maruzen Co., Ltd.), "Fuel Cell Analysis Method" (compiled by Takasu Yoshio, Yoshitake Yu, and Ishihara Tatsumi of KAGAKU DOJIN), and an article by D. Dollion and G. R. Heal in J. Appl. Chem. 14, 109 (1964) may be employed. In this description, the radius and pore volume of mesopores by a nitrogen adsorption method (DH method) are a value measured by the method disclosed in the article written by D. Dollion and G. R. Heal in J. Appl. Chem. 14, 109 (1964).

A method of manufacturing a catalyst having a specific pore distribution as described above is not particularly limited, but it is important to make a pore distribution (micropores and mesopores) of a support typically the above-described pore distribution. Specifically, as a method of manufacturing a support having micropores and mesopores illustrated in FIG. 2 and satisfying the above-described relationship between the surface area formed by micropores and the surface area formed by mesopores, a method disclosed in U.S. Pat. No. 6,398,858 is preferably used. As a method of manufacturing a support having micropores and mesopores illustrated in FIG. 3 and satisfying the above-described relationship between the surface area formed by micropores and the surface area formed by mesopores, a method disclosed in WO 2009/075264 (US 2011/058308 A1) or the like is preferably used.

A material of the support is not particularly limited if pores (primary pores) having above-described pore volume or mode radius can be formed inside the support and if the support has enough specific surface area and enough electron conductivity to support a catalyst component inside the mesopores in a dispersed state. Preferably, a main component is carbon. Specifically, carbon particles made of carbon black (Ketjen Black, oil furnace black, channel black, lamp black, thermal black, acetylene black, or the like), activated charcoal, or the like may be exemplified. The expression "main component is carbon" denotes that the support contains carbon atoms as a main component, and includes both of the configurations that the support consists only of carbon atoms and that the support substantially consists of carbon atoms. An element(s) other than carbon atom may be contained. The expression "substantially consists of carbon atoms" denotes that impurities of about 2 to 3 wt % or less can be contaminated.

More preferably, in view of easy formation of a desired pore space inside a support, carbon black is used; and particularly preferably, Black Pearls (registered trademark) 2000 is used.

Besides the aforementioned carbon materials, a porous metal such as Sn (tin) or Ti (titanium) or a conductive metal oxide can also be used as the support.

An average primary particle diameter of the support is preferably in the range of 10 to 100 nm. If the average primary particle diameter is within such a range, even in the case where the above-described pore structure is formed in the support, mechanical strength can be maintained, and a catalyst layer can be controlled within an appropriate range. As a value of the "average particle diameter of a support", unless otherwise noted, a value calculated as an average value of particle diameters of particles observed within several or several tens of fields by using observation means such as a scanning electron microscope (SEM) or a transmission electron microscope (TEM) is employed. In addition, the "particle diameter" denotes a maximum distance among distances between arbitrary two points on an outline of a particle.

In the present invention, there is no need to use the above-described granular porous support, so long as the support has the above-described pore distributions of micropores and mesopores (difference in surface area between the micropores and the mesopores) in the catalyst.

Namely, as the support, a non-porous conductive support, nonwoven fabric, carbon paper, carbon cloth, or the like made of carbon fiber constituting a gas diffusion layer, or the like may be exemplified. In this case, the catalyst can be supported on the non-porous conductive support or can be directly attached to the nonwoven fabric, the carbon paper, the carbon cloth, or the like made of the carbon fiber constituting the gas diffusion layer of the membrane electrode assembly.

A catalyst metal which can be used in the present invention performs catalysis of electrochemical reaction. As a catalyst metal used for an anode catalyst layer, a well-known catalyst can be used in a similar manner without particular limitation if the catalyst has catalytic effects on oxidation reaction of hydrogen. In addition, as a catalyst metal used for a cathode catalyst layer, a well-known catalyst can be used in a similar manner without particular limitation if the catalyst has catalytic effects on reduction reaction of oxygen. Specifically, the catalyst metal can be selected among metals such as platinum, ruthenium, iridium, rhodium, palladium, osmium, tungsten, lead, iron, copper, silver, chromium, cobalt, nickel, manganese, vanadium, molybdenum, gallium, and aluminum, and alloys thereof.

Among them, in view of improved catalytic activity, poison resistance to carbon monoxide or the like, heat resistance, or the like, a catalyst metal containing at least platinum is preferably used. Namely, the catalyst metal preferably is platinum or contains platinum and a metal component other than the platinum, more preferably is platinum or a platinum-containing alloy. Such a catalyst metal can exhibit high activity. Although a composition of an alloy depends on a kind of the metal constituting the alloy, a content of platinum may be in the range of 30 to 90 atom %, and a content of a metal constituting the alloy together with platinum may be in the range of 10 to 70 atom %. In general, an alloy is obtained by mixing a metal element with at least one metal element or non-metal element, and is a general term for substances having metallic properties. The structure of the alloy includes an eutectic alloy which is a mixture where component elements form separate crystals, an alloy where component elements are completely fused to form a solid solution, an alloy where component elements form a intermetallic compound or a compound between a metal and a non-metal, and the like, and any one thereof may be employed in the present application. A catalyst metal used in an anode catalyst layer and a catalyst metal used in a cathode catalyst layer can be appropriately selected from the aforementioned alloys. In this description, unless otherwise noted, the description of the catalyst metal for the anode catalyst layer and the catalyst metal for the cathode catalyst layer have the same definition. However, the catalyst metal for the anode catalyst layer and the catalyst metal for the cathode catalyst layer are not necessarily the same, and the catalyst metals can be appropriately selected so that the desired functions described above can be attained.

A shape and size of the catalyst metal (catalyst component) are not particularly limited, but the shapes and sizes of well-known catalyst components may be employed. As the shape, for example, a granular shape, a squamous shape, a laminar shape, or the like may be used, but the granular shape is preferred. In this case, an average particle diameter of catalyst metals (catalyst metal particles) is not particularly limited, but it is preferably 4.1 nm or more, more preferably in the range of 4.1 to 30 nm or less, particularly preferably in the range of 4.1 to 10 nm or less. If the average particle diameter of catalyst metals is 4.1 nm or more, activity and stability of catalyst metals can be more improved. Further, since the catalyst metals are relatively strongly supported in the mesopores, the catalyst metals can be more effectively suppressed and prevented from being detached under a mechanical stress. In addition, contact with an electrolyte in a catalyst layer can be more effectively suppressed and prevented. In addition, the micropores are not blocked by the catalyst metals but remain, and thus, a gas transport path can be more efficiently secured, so that gas transport resistance can be further reduced. In addition, elution due to a change in voltage can be prevented, and temporal degradation in performance can be also suppressed. Therefore, catalytic activity can be further improved, namely, catalyst reaction can be more efficiently facilitated. On the other hand, if the average particle diameter of the catalyst metal particles is 30 nm or less, the catalyst metals can be supported inside the mesopores of the supports by a simple method, so that a covering ratio of catalyst metals with an electrolyte can be reduced. In the present invention, the "average particle diameter of catalyst metal particles" can be measured as an average value of a crystallite diameter obtained from a half-value width of a diffraction peak of a catalyst metal component in X-ray diffraction (XRD) spectroscopy or as an average value of a particle diameter of catalyst metal particles examined from a transmission electron microscope (TEM) image. In this description, the "average particle diameter of catalyst metal particles" is an average value of a particle diameter of a catalyst component(s) examined from transmission electron microscope images for a statistically meaningful number (for example, at least 203) of samples.

In this embodiment, a catalyst content per unit catalyst-coated area (mg/cm$^2$) is not particularly limited so long as a sufficient dispersibility of catalyst on a support and power generation performance can be obtained. For example, the catalyst content is in the range of 0.01 to 1 mg/cm$^2$. However, in the case where the catalyst contains platinum or a platinum-containing alloy, a platinum content per unit catalyst-coated area is preferably 0.5 mg/cm$^2$ or less. The usage of expensive noble metal catalyst represented by platinum (Pt) or a platinum alloy induces an increased cost of a fuel cell. Therefore, it is preferable to reduce the cost by decreasing an amount (platinum content) of the expensive platinum to the above-described range. A lower limit is not particularly limited so long as power generation performance can be attained, and for example, the lower limit value is 0.01 mg/cm$^2$ or more. The content of the platinum is more preferably in the range of 0.02 to 0.4 mg/cm$^2$. In this embodiment, since the activity per catalyst weight can be improved by controlling the pore structure of the support, the amount of an expensive catalyst can be reduced.

In this description, an inductively coupled plasma emission spectroscopy (ICP) is used for measurement (determination) of a "content of catalyst (platinum) per unit catalyst-coated area ($mg/cm^2$)". A method of obtaining a desired "content of catalyst (platinum) per unit catalyst-coated area ($mg/cm^2$)" can be easily performed by the person skilled in the art, and the content can be adjusted by controlling a slurry composition (catalyst concentration) and a coated amount.

A supported amount (in some cases, referred to as a support ratio) of a catalyst on a support is preferably in the range of 10 to 80 wt %, more preferably in the range of 20 to 70 wt %, with respect to a total amount of the catalyst support (that is, the support and the catalyst). The supported amount within the aforementioned range is preferable in terms of sufficient dispersibility of a catalyst component on a support, improved power generation performance, economical merit, and catalytic activity per unit weight.

[Method of Manufacturing Catalyst]

A method of manufacturing a catalyst according to the present invention is not particularly limited so long as the produced catalyst satisfy the above-described features (a) to (c). A method which comprises precipitating a catalyst metal on a surface of catalyst support, and thereafter performing heat treatment to increase a particle diameter of the catalyst metal is preferred. The method increases a granular size of the catalyst metals by the heat treatment after the precipitating. Therefore, the catalyst metals having a large particle diameter can be supported in pores (particularly, mesopores) of catalyst support. Namely, the present invention also provides a method of manufacturing the catalyst according to the present invention, which includes (i) a step (precipitation step) of precipitating a catalyst metal on a surface of a catalyst support and (ii) a step (heat treatment step) of, after the precipitation step, performing heat treatment to increase a particle diameter of the catalyst metal. Hereinafter, the method will be described, but the present invention is not limited to the following form.

(i) Precipitation Step

In this step, a catalyst metal(s) is allowed to be precipitated on a surface(s) of a catalyst support(s). The step has been known in the art and, for example, a method of immersing the catalyst supports in a precursor solution of the catalyst metal and, after that, performing reduction is preferably used.

Herein, a precursor of catalyst metal is not particularly limited, but it is appropriately selected according to a kind of the catalyst metal which is to be used. Specifically, chlorides, nitrates, sulfates, chlorides, acetates, amine compounds or the like of the catalyst metals such as platinum as described above may be exemplified. More specifically, chlorides such as platinum chloride (hexachloroplatinic acid hexahydrate), palladium chloride, rhodium chloride, and ruthenium chloride, nitrates such as palladium nitrate, rhodium nitrate, and iridium nitrate, sulfates such as palladium sulfate and rhodium sulfate, acetates such as rhodium acetate, ammine compounds such as dinitrodiammine platinum nitric acid and dinitrodiammine palladium, or the like may be preferably exemplified. In addition, a solvent used for manufacturing the precursor solution of catalyst metal is not particularly limited so long as the solvent can dissolve the precursor of catalyst metal. The solvent is appropriately selected according to a kind of the precursor of catalyst metal which is to be used. Specifically, water, acids, alkalis, organic solvents, or the like may be exemplified. A concentration of the precursor of catalyst metal in the precursor solution of the catalyst metal is not particularly limited, but is preferably in the range of 0.1 to 50 wt %, more preferably in the range of 0.5 to 20 wt %, in terms of metal. When the catalyst support is immersed in the precursor solution of catalyst metal, the immersion is preferably performed under a reduced pressure so that the solution is infiltrated into the inner portion of the support.

As a reducing agent, hydrogen, hydrazine, sodium hydroborate, sodium thiosulfate, citric acid, sodium citrate, L-ascorbic acid, sodium borohydride, formaldehyde, methanol, ethanol, ethylene, carbon monoxide, or the like may be exemplified. A material which is gaseous at room temperature such as hydrogen can be supplied by bubbling. An amount of the reducing agent is not particularly limited so long as the precursor of catalyst metal can be reduced to the catalyst metal, and a well-known amount can be applied in the same manner.

Precipitation conditions are not particularly limited so long as the catalyst metal can be precipitated on the catalyst support. For example, a precipitation temperature is preferably a temperature around the boiling point of the solvent, more preferably in the range of room temperature to 100° C. A precipitation time is preferably in the range of 1 to 10 hours, more preferably in the range of 2 to 8 hours. The precipitation step may be performed while stirring and mixing if necessary.

By the step, the precursor of the catalyst metal is reduced to the catalyst metal, so that the catalyst metal is precipitated (supported) on the catalyst support.

(ii) Heat treatment Step

In this step, after the (i) precipitation step, heat treatment is performed to increase a particle diameter of the catalyst metals.

Heat treatment conditions are not particularly limited so long as a particle diameter of the catalyst metals increase. For example, a heat treatment temperature is preferably in the range of 300 to 1200° C., more preferably in the range of 500 to 1150° C., particularly preferably in the range of 700 to 1000° C. A heat treatment time is preferably in the range of 0.02 to 3 hours, more preferably in the range of 0.1 to 2 hours, particularly preferably in the range of 0.2 to 1.5 hours. The heat treatment step may be performed in a hydrogen ambience.

By this step, the catalyst metal increases its particle diameter in the catalyst support (particularly, in the mesopores of the catalyst support). Therefore, the catalyst metal particles are hardly detached outside (from the catalyst supports). In addition, due to the microspores existing in the vicinity of the surface of the catalyst support from the catalyst metal, the catalyst metals having a larger size can be more effectively suppressed and prevented from being detached from the catalyst support even under a mechanical stress. Therefore, the catalyst can be more effectively used.

[Catalyst Layer]

As described above, the catalyst of the present invention can reduce gas transport resistance, so that the catalyst can exhibit a high catalytic activity and in other words, catalyst reaction can be promoted. Therefore, the catalyst of the present invention can be advantageously used for an electrode catalyst layer for fuel cell. Namely, the present invention provides an electrode catalyst layer for fuel cell including the catalyst and the electrode catalyst according to the present invention. According to the above-described configuration, even in the case where a mechanical stress is exerted at the time of manufacturing an electrode catalyst layer by mixing the catalyst with an electrolyte, detachment of the catalyst metal outside the catalyst support (particularly, out of the mesopore) can be effectively suppressed and prevented. Therefore, a availability of the catalyst in the catalyst layer can be improved. In addition, in relation to deterioration of the catalyst metal, the catalyst metals are hardly agglomerated, so that increase in surface area is suppressed. Therefore, durability of the catalyst metal can be improved.

Figure 4:
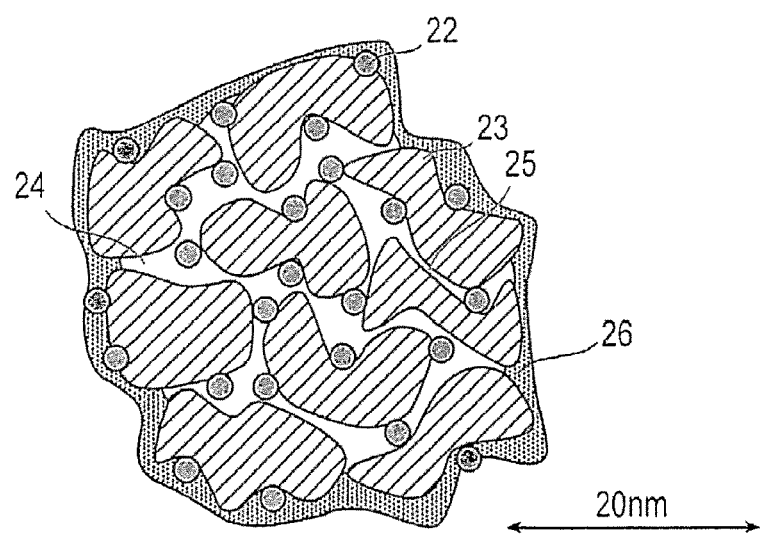
FIG. 4 is a schematic diagram illustrating a relationship between a catalyst and an electrolyte in a catalyst layer according to an embodiment of the present invention.
Figure 5:
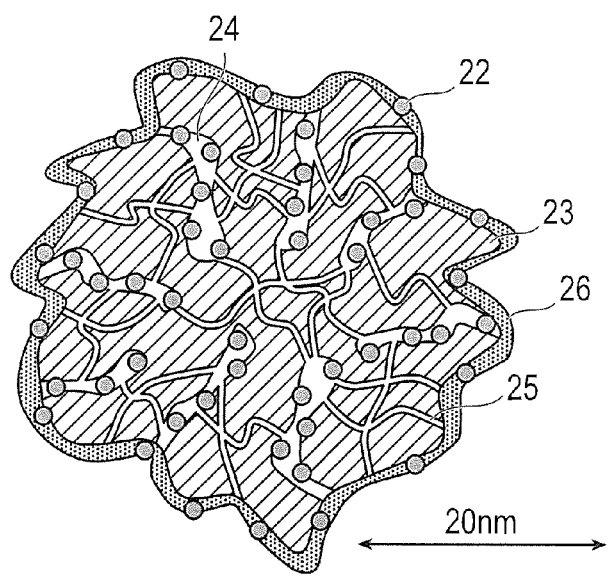
FIG. 5 is a schematic diagram illustrating a relationship between a catalyst and an electrolyte in a catalyst layer according to another embodiment of the present invention.

FIG. 4 is a schematic diagram illustrating a relationship between a catalyst and an electrolyte in a catalyst layer according to an embodiment of the present invention. Specifically, FIG. 4 is a schematic diagram illustrating a relationship between a catalyst and an electrolyte in the case where the catalyst of FIG. 2 and an electrolyte are mixed. In addition, FIG. 5 is a schematic diagram illustrating a relationship between a catalyst and an electrolyte in a catalyst layer according to another embodiment of the present invention. Specifically, FIG. 5 is a schematic diagram illustrating a relationship between a catalyst and an electrolyte in the case where the catalyst of FIG. 3 and an electrolyte are mixed.

As illustrated in FIGS. 4 and 5, in the catalyst layer according to the present invention, although the catalyst is coated with the electrolyte 26, the electrolyte 26 does not enter the mesopores 24 (and the micropores 25) of the catalyst (support 23). Therefore, although the catalyst metal 22 on the surface of the support 23 is in contact with the electrolyte 26, the catalyst metal 22 supported in the mesopore 24 is not in contact with the electrolyte 26. The catalyst metal in the mesopore forms three-phase boundary with an oxygen gas and water in a state that the catalyst metal is not in contact with the electrolyte, so that a reaction active area of the catalyst metals can be secured.

Although the catalyst according to the present invention may exist either in a cathode catalyst layer or an anode catalyst layer, the catalyst is preferably used in a cathode catalyst layer. As described above, although the catalyst according to the present invention is not in contact with the electrolyte, the catalyst can be effectively used by forming three-phase boundary of the catalyst and water. This is because water is formed in the cathode catalyst layer.

An electrolyte is not particularly limited, but it is preferably an ion-conductive polymer electrolyte. Since the polymer electrolyte serves to transfer protons generated in the vicinity of the catalyst active material on a fuel electrode side, the polymer electrolyte is also referred to as a proton conductive polymer.

The polymer electrolyte is not particularly limited, but well-known knowledge in the art can be appropriately referred to. The polymer electrolytes are mainly classified into fluorine-based polymer electrolytes and hydrocarbon-based polymer electrolytes depending on a type of an ion-exchange resin as a constituent material.

As an ion-exchange resin constituting the fluorine-based polymer electrolyte, for example, perfluorocarbon sulfonic acid based polymers such as Nafion (registered trademark, produced by DuPont), Aciplex (registered trademark, produced by Asahi Kasei Co., Ltd.), and Flemion (registered trademark, produced by Asahi Glass Co., Ltd.), perfluorocarbon phosphoric acid based polymers, trifluorostyrene sulfonic acid based polymers, ethylene tetrafluoroethylene-g-styrene sulfonic acid based polymers, ethylene-tetrafluoroethylene copolymers, polyvinylidene fluoride-perfluorocarbon sulfonic acid based polymers, and the like may be exemplified. In terms excellent heat resistance, chemical stability, durability, and mechanical strength, the fluorine-based polymer electrolyte is preferably used, and a fluorine-based polymer electrolyte formed of a perfluorocarbon sulfonic acid based polymer is particularly preferably used.

As a hydrocarbon-based electrolyte, sulfonated polyether sulfones (S-PES), sulfonated polyaryl ether ketones, sulfonated polybenzimidazole alkyls, phosphonated polybenzimidazole alkyls, sulfonated polystyrenes, sulfonated polyether ether ketones (S-PEEK), sulfonated polyphenylenes (S-PPP), and the like may be exemplified. In terms of manufacturing advantages such as inexpensive raw materials, simple manufacturing processes, and high selectivity of materials, a hydrocarbon-based polymer electrolyte is preferably used. These ion-exchange resins may be singly used, or two or more resins may be used together. In addition, the material is not limited to the above-described material, but another material may be used.

With respect to the polymer electrolyte which serves to transfer protons, proton conductivity is important. In the case where EW of a polymer electrolyte is too large, ion conductivity with in the entire catalyst layer would be decreased. Therefore, the catalyst layer according to the embodiment preferably includes a polymer electrolyte having a small EW. Specifically, catalyst layer according to the embodiment preferably includes a polymer electrolyte having an EW of 1500 g/eq. or less, more preferably includes a polymer electrolyte having an EW of 1200 g/eq. or less, and particularly preferably includes a polymer electrolyte having an EW of 1000 g/eq. or less.

On the other hand, in the case where the EW is too small, since hydrophilicity is too high, water is hard to smoothly move. Due to such a point of view, the EW of polymer electrolyte is preferably 600 g/eq. or more. The EW (Equivalent Weight) represents an equivalent weight of an exchange group having proton conductivity. The equivalent weight is a dry weight of an ion exchange membrane per 1 eq. of ion exchange group, and is represented in units of "g/eq.".

It is preferable that the catalyst layer includes two types or more of polymer electrolytes having different EWs in a power generation surface, and in this case, among the polymer electrolytes, the polymer electrolyte having the lowest EW is used in an area where relative humidity of a gas in a passage is 90% or less. By employing such material arrangement, resistance is decreased irrespective of a current density area, so that cell performance can be improved. The EW of polymer electrolyte used in the area where relative humidity of the gas in a passage is 90% or less, that is, EW of polymer electrolyte having the lowest EW is preferably 900 g/eq. or less. By this, the above-described effects can be further more certainly and more remarkably attained.

The polymer electrolyte having the lowest EW is preferably used in an area of which temperature is higher than an average temperature of inlet and outlet for cooling water. By this, resistance is decreased irrespective of a current density area, so that cell performance can be further improved.

In terms decreased resistance value of a fuel cell system, the polymer electrolyte having the lowest EW is preferably provided in an area within the range of $3/5$ or less of the passage length from a gas supply inlet of at least one of a fuel gas and an oxidant gas.

The catalyst layer according to the embodiment may include, between the catalyst and the polymer electrolyte, a liquid proton conducting material capable of connecting the catalyst and the polymer electrolyte in a proton conductible state. By introducing the liquid proton conducting material, a proton transport path through the liquid proton conducting material is provided between the catalyst and the polymer electrolyte, so that protons necessary for the power generation can be efficiently transported on the surface of the catalyst. By this, availability of the catalyst is improved, and thus an amount of used catalyst can be reduced while maintaining power generation performance. The liquid proton conducting material may be interposed between the catalyst and the polymer electrolyte. The liquid proton conducting material may be disposed in pores (secondary pores) between porous supports in a catalyst layer or may be disposed in pores (micropores or mesopores: primary pores) in porous supports.

The liquid proton conducting material is not particularly limited if the material has ion conductivity and has a function of forming a proton transport path between the catalyst and the polymer electrolyte. Specifically, water, aprotic ionic liquid, an aqueous solution of perchloric acid, an aqueous solution of nitric acid, an aqueous solution of formic acid, an aqueous solution of acetic acid, and the like may be exemplified.

In the case of using water as the liquid proton conducting material, the water can be introduced as the liquid proton conducting material into the catalyst layer by wetting the catalyst layer with a small amount of liquid water or a humidified gas before the start of power generation. In addition, water generated through electrochemical reaction during the operation of a fuel cell may be used as the liquid proton conducting material. Therefore, in a state where a fuel cell starts to be operated, the liquid proton conducting material is not necessarily retained. For example, a surface distance between the catalyst and the electrolyte is preferably set to be a diameter of an oxygen ion constituting a water molecule, that is, 0.28 nm or more. By maintaining such a distance, water (liquid proton conducting material) can be interposed between the catalyst and the polymer electrolyte (in the liquid conducting material retaining portion) while maintaining the non-contact state between the catalyst and the polymer electrolyte, so that a proton transport path can be secured by water therebetween.

In the case of using a material such as an ionic liquid other than water as the liquid proton conducting material, the ionic liquid, the polymer electrolyte, and the catalyst are preferably allowed to be dispersed in a solution in the preparation of a catalyst ink. However, the ionic liquid may be added at the time of coating a catalyst layer substrate with a catalyst.

In the catalyst according to the present invention, a total area of the catalyst which is in contact with the polymer electrolyte is set to be smaller than a total area of the catalyst exposed to the liquid conducting material retaining portion.

Comparison of these areas can be performed, for example, by obtaining a magnitude relationship between capacitance of an electrical double layer formed in a catalyst-polymer electrolyte interface and capacitance of an electrical double layer formed in a catalyst-liquid proton conducting material interface in a state where the liquid conducting material retaining portion is filled with the liquid proton conducting material. Namely, since capacitance of an electrical double layer is proportional to an area of an electrochemically effective interface, if the capacitance of the electrical double layer formed in the catalyst-electrolyte interface is smaller than the capacitance of the electrical double layer formed in the catalyst-liquid proton conducting material interface, a contact area of the catalyst with the electrolyte is smaller than an area thereof exposed to the liquid conducting material retaining portion.

Herein, a measuring method for capacitance of an electrical double layer formed in a catalyst-electrolyte interface and capacitance of an electrical double layer formed in a catalyst-liquid proton conducting material interface, that is, a magnitude relationship between a contact area of the catalyst with the electrolyte and a contact area of the catalyst and the liquid proton conducting material (determination method for a magnitude relationship between a contact area of the catalyst and the electrolyte and an area of the catalyst exposed to the liquid conducting material retaining portion) will be described.

Namely, in the catalyst layer according to the embodiment, the following four types of interfaces can contribute as capacitance of electrical double layer (Cdl):
(1) catalyst-polymer electrolyte (C-S)
(2) catalyst-liquid proton conducting material (C-L)
(3) porous support-polymer electrolyte (Cr-S)
(4) porous support-liquid proton conducting material (Cr-L)

As described above, since capacitance of an electrical double layer is proportional to an area of an electrochemically effective interface, $Cdl_{C-S}$ (capacitance of an electrical double layer in a catalyst-polymer electrolyte interface) and $Cdl_{C-L}$ (capacitance of an electrical double layer in a catalyst-liquid proton conducting material interface) may be obtained. Therefore, the contribution of the four types of interfaces to capacitance of an electrical double layer (Cdl) can be identified as follows.

First, for example, under a high humidity condition such as 100% RH and under a lower humidity condition such as 10% RH or less, each capacitance of electrical double layers is measured. As a measurement method for the capacitance of electrical double layer, cyclic voltammetry, electrochemical impedance spectroscopy, or the like may be exemplified. From the comparison, the contribution of the liquid proton conducting material (in this case, "water"), that is, the above-described contributions (2) and (4) can be identified.

In addition, the contributions to capacitance of an electrical double layer can be identified by deactivating a catalyst, for example, in the case of using Pt as the catalyst, by deactivating the catalyst by supply CO gas to an electrode to be measured to allow CO to be adsorbed on the surface of Pt. In this state, as described above, under the high humidity condition and under the low humidity condition, each capacitance of electrical double layers is measured by the same method, and from the comparison, the contributions of the catalyst, that is, the above-described contributions (1) and (2) can be identified.

By using the above-described method, all the contributions (1) to (4) described above can be identified, the capacitance of the electrical double layer in the interface between the catalyst and the polymer electrolyte and the capacitance of the electrical double layer in the interface between the catalyst and the liquid proton conducting material can be obtained.

Namely, a measurement value (A) in a highly-humidified state can be regarded as capacitance of electrical double layer formed in all the interfaces (1) to (4), and a measurement value (B) in a lowly-humidified state can be regarded as capacitance of the electrical double layer formed in the interfaces (1) and (3). In addition, a measurement value (C) in a catalyst-deactivated and highly-humidified state can be regarded as capacitance of the electrical double layer formed in the interfaces (3) and (4), and a measurement value (D) in a catalyst-deactivated and lowly-humidified state can be regarded as capacitance of the electrical double layer formed in the interface (3).

Therefore, the difference between A and C can be regarded as the capacitance of the electrical double layer formed in the interfaces (1) and (2), and the difference between B and D can be regarded as the capacitance of the electrical double layer formed in the interface (1). Next, by calculating the difference between these values, i.e., (A-C)–(B-D), the capacitance of the electrical double layer formed in the interface (2) can be obtained. In addition, a contact area of the catalyst with the polymer electrolyte or an exposed area thereof to the conducting material retaining portion can be obtained by, for example, TEM (transmission electron microscope) tomography besides the above-described method.

If necessary, the catalyst layer may contain additives of a water repellent such as polytetrafluoroethylene, polyhexafluoropropylene, and tetrafluoroethylene-hexafluoropropylene copolymer, a dispersant such as a surfactant, a thickener such as glycerin, ethylene glycol (EG), polyvinyl alcohol (PVA), and propylene glycol (PG); a pore-forming agent, or the like.

A thickness (as a dried thickness) of the catalyst layer is preferably in the range of 0.05 to 30 μm, more preferably in the range of 1 to 20 μm, even more preferably in the range of 2 to 15 μm. The thickness can be applied to both of the cathode catalyst layer and the anode catalyst layer. However, the thickness of the cathode catalyst layer and the thickness of the anode catalyst layer may be equal to or different from each other.

(Method of Manufacturing Catalyst Layer)

Hereinafter, a method for manufacturing the catalyst layer will be described as an exemplary embodiment, but the scope of the present invention is not limited to the following embodiment. In addition, all the conditions for the components and the materials of the catalyst layer are as described above, and thus, the description thereof is omitted.

First, a support (in this description, also referred to as a "porous support" or a "conductive porous support") is prepared. Specifically, the support may be manufactured as described above in the method of manufacturing the support. By this, pores having a specific pore distribution (pores including micropores and mesopores, a pore volume of the micropore being 0.3 cc/g support or more, and/or a mode radius of a pore distribution of the micropores being 0.3 nm or more and less than 1 nm) can be formed in the support.

Next, the catalyst is supported on the porous support, so that a catalyst powder is prepared. The supporting of the catalyst on the porous support can be performed by a well-known method. For example, a well-known method such as an impregnation method, a liquid phase reduction supporting method, an evaporation drying method, a colloid adsorption method, a spray pyrolysis method, or reverse micelle (micro-emulsion method) may be used.

Subsequently, a catalyst ink containing the catalyst powder, polymer electrolyte, and a solvent is prepared. As the solvent, there is no particular limitation. A typical solvent used for forming a catalyst layer may be similarly used. Specifically, water such as tap water, pure water, ion-exchanged water, distilled water, cyclohexanol, a lower alcohol having 1 to 4 carbons such as methanol, ethanol, n-propanol, isopropanol, n-butanol, sec-butanol, isobutanol, and tert-butanol, propylene glycol, benzene, toluene, xylene, or the like may be used. Besides, acetic acid butyl alcohol, dimethyl ether, ethylene glycol, or the like may be used as a solvent. These solvents may be used alone or may be used in a state of a mixture of two or more solvents.

An amount of solvent for preparing the catalyst ink is not particularly limited so long as the electrolyte can be completely dissolved. Specifically, a concentration (a solid content) of the catalyst powder and the polymer electrolyte is preferably in the range of 1 to 50 wt % in the electrode catalyst ink, more preferably in the range of about 5 to 30 wt %.

In the case of using an additive such as a water repellent, a dispersant, a thickener, and a pore-forming agent, the additive may be added to the catalyst ink. In this case, an added amount of the additive is not particularly limited so long as it does not interfere with the above-described effects by the present invention. For example, the added amount of the additive is preferably in the range of 5 to 20 wt %, with respect to the total weight of the electrode catalyst ink.

Next, a surface of a substrate is coated with the catalyst ink. A method of coating the substrate is not particularly limited, but a well-known method may be used. Specifically, a well-known method such as a spray (spray coat) method, a Gulliver printing method, a die coater method, a screen printing method, or a doctor blade method can be used.

As the substrate coated with the catalyst ink, a solid polymer electrolyte membrane (electrolyte layer) or a gas diffusion substrate (gas diffusion layer) may be used. In this case, after the catalyst layer is formed on a surface of a solid polymer electrolyte membrane (electrolyte layer) or a gas diffusion substrate (gas diffusion layer), the resultant laminate may be used as it is for manufacturing a membrane electrode assembly. Alternatively, as the substrate, a peelable substrate such as a polytetrafluoroethylene (PTFE) [Teflon (registered trademark)] sheet can be used, and after a catalyst layer is formed on the substrate, the catalyst layer portion can be peeled off from the substrate, so that the catalyst layer may be obtained.

Finally, the coat layer (film) of the catalyst ink is dried under an air ambience or under an inert gas ambience at a temperature ranging from room temperature to 150° C. for a time ranging from 1 to 60 minutes. By this, the catalyst layer can be formed.

(Membrane Electrode Assembly)

According to another embodiment of the present invention, provided is a membrane electrode assembly for a fuel cell including the above-described electrode catalyst layer for fuel cell. Namely, provided is a membrane electrode assembly for fuel cell which comprises a solid polymer electrolyte membrane 2, a cathode catalyst layer disposed on one side of the electrolyte membrane, an anode catalyst layer disposed on the other side of the electrolyte membrane, and a pair of gas diffusion layers (4a, 4c) interposing the electrolyte membrane 2, the anode catalyst layer 3a, and the cathode catalyst layer 3c. In the membrane electrode assembly, at least one of the cathode catalyst layer and the anode catalyst layer is the catalyst layer according to the embodiment described above.

However, by taking into consideration necessity of improved proton conductivity and improved transport characteristic (gas diffusibility) of a reaction gas (particularly, $O_2$), at least the cathode catalyst layer is preferably the catalyst layer according to the embodiment described above. However, the catalyst layer according to the embodiment is not particularly limited. The catalyst layer may be used as the anode catalyst layer or may be used as the cathode catalyst layer and the anode catalyst layer.

According to further embodiment of the present invention, provided is a fuel cell including the membrane electrode assembly according to the embodiment. Namely, according to one aspect, the present invention provides a fuel cell comprising a pair of anode separator and cathode separator interposing the membrane electrode assembly according to the embodiment.

Hereinafter, members of a PEFC 1 using the catalyst layer according to the embodiment will be described with reference to FIG. 1. However, the present invention has features with respect to the catalyst layer. Therefore, among members constituting the fuel cell, specific forms of members other than the catalyst layer may be appropriately modified with reference to well-known knowledge in the art.

(Electrolyte Membrane)

An electrolyte membrane is configured with a solid polymer electrolyte membrane 2 in the same form illustrated in, for example, FIG. 1. The solid polymer electrolyte membrane 2 serves to selectively transmit protons generated in an anode catalyst layer 3a to a cathode catalyst layer 3c in the thickness direction during the operation of the PEFC 1. In addition, the solid polymer electrolyte membrane 2 also serves as a partition wall for preventing a fuel gas supplied to an anode side from being mixed with an oxidant gas supplied to a cathode side.

An electrolyte material constituting the solid polymer electrolyte membrane 2 is not particularly limited, but well-known knowledge in the art may be appropriately referred to. For example, the fluorine-based polymer electrolyte or the hydrocarbon-based polymer electrolyte described above as the polymer electrolyte can be used. There is no need to use the polymer electrolyte which is necessarily the same as the polymer electrolyte used for the catalyst layer.

A thickness of the electrolyte layer is not particularly limited, but it may be determined by taking into consideration characteristics of the obtained fuel cell. The thickness of the electrolyte layer is typically in the range of about 5 to 300 μm. If the thickness of the electrolyte layer is within such a range, balance between strength during the film formation or durability during the use and output characteristics during the use can be appropriately controlled.

(Gas Diffusion Layer)

A gas diffusion layer (anode gas diffusion layer 4a, cathode gas diffusion layer 4c) serves to facilitate diffusion of a gas (fuel gas or oxidant gas) supplied through a gas passage (6a, 6c) of a separator to a catalyst layer (3a, 3c) and also serves as an electron conducting path.

A material constituting a substrate of the gas diffusion layers (4a, 4c) is not particularly limited, but well-known knowledge in the related art may be appropriately referred to. For example, a sheet-shaped material having conductivity and porous property such as a fabric made of carbon, a sheet-shaped paper, felt, and a nonwoven fabric may be exemplified. A thickness of the substrate may be appropriately determined by considering characteristics of the obtained gas diffusion layer. The thickness of the substrate may be in the range of about 30 to 500 μm. If the thickness of the substrate is within such a range, balance between mechanical strength and diffusibility of gas, water, and the like can be appropriately controlled.

The as diffusion layer preferably includes a water repellent for the purpose of preventing a flooding phenomenon or the like by improving water repellent property. The water repellent is not particularly limited, but fluorine-based polymer materials such as polytetrafluoroethylene (PTFE), polyvinylidene fluoride (PVdF), polyhexafluoropropylene, and tetrafluoroethylene-hexafluoropropylene copolymer (FEP), polypropylene, polyethylene, and the like may be exemplified.

In order to further improve water repellent property, the gas diffusion layer may include a carbon particle layer (microporous layer (MPL), not shown) configured with an assembly of carbon particles including a water repellent provided at the catalyst-layer side of the substrate.

Carbon particles included in the carbon particle layer are not particularly limited, but well-known materials in the art such as carbon black, graphite, and expandable graphite may be appropriately employed. Among the materials, due to excellent electron conductivity and a large specific surface area, carbon black such as oil furnace black, channel black, lamp black, thermal black, and acetylene black can be preferably used. An average particle diameter of the carbon particles may be set to be in the range of about 10 to 100 nm. By this, high water-repellent property by a capillary force can be obtained, and contacting property with the catalyst layer can be improved.

As the water repellent used for the carbon particle layer, the above-described water repellent may be exemplified. Among the materials, due to excellent water repellent property and excellent corrosion resistance during the electrode reaction, the fluorine-based polymer material can be preferably used.

A mixing ratio of the carbon particles and the water repellent in the carbon particle layer may be set to be in the range of weight ratio of about 90:10 to 40:60 (carbon particle: water repellent) by taking into consideration balance between water repellent property and electron conductivity. Meanwhile, a thickness of the carbon particle layer is not particularly limited, but it may be appropriately determined by taking into consideration water repellent property of the obtained gas diffusion layer.

(Method of Manufacturing Membrane Electrode Assembly)

A method of manufacturing a membrane electrode assembly is not particularly limited, and a well-known method in the art may be used. For example, a method which comprises transferring a catalyst layer to a solid polymer electrolyte membrane by using a hot press, or coating a solid polymer electrolyte membrane with a catalyst layer and drying the coating, and joining the resulting laminate with gas diffusion layers, or a method which comprises coating a microporous layer (in the case of not including a microporous layer, one surface of a substrate layer) of a gas diffusion layer with a catalyst layer in advance and drying the resulting product to produce two gas diffusion electrodes (GDEs), and joining both surfaces of the solid polymer electrolyte membrane with the two gas diffusion electrodes by using a hot press can be used. The coating and joining conditions by hot press and the like may be appropriately adjusted according to a type of the polymer electrolyte (perfluorosulfonic acid-based or hydrocarbon-based) in the solid polymer electrolyte membrane or the catalyst layer.

(Separator)

In the case of configuring a fuel cell stack by connecting a plurality of unit fuel cells of polymer electrolyte fuel cells in series, a separator serves to electrically connect the cells in series. The separator also serves as a partition wall for separating a fuel gas, an oxidant gas, and a coolant from each other. In order to secure a passage thereof, as described above, gas passages and coolant passages are preferably installed in each of the separators. As a material constituting the separator, well-known materials in the art of carbon such as dense carbon graphite and a carbon plate, a metal such as a stainless steel, or the like can be employed without limitation. A thickness or size of the separator, a shape or size of the installed passages, and the like are not particularly limited, but they can be appropriately determined by taking into consideration desired output characteristics and the like of the obtained fuel cell.

A manufacturing method for the fuel cell is not particularly limited, and well-known knowledge in the art in the field of fuel cell may be appropriately referred to.

Furthermore, in order that the fuel cell can generate a desired voltage, a fuel cell stack may be formed by connecting a plurality of membrane electrode assemblies in series through a separator. A shape and the like of the fuel cell are not particularly limited, and they may be appropriately determined so as to obtain desired cell characteristics such as a voltage.

The above-described PEFC or membrane electrode assembly uses the catalyst layer having excellent power generation performance and excellent durability. Therefore, the PEFC or membrane electrode assembly shows excellent power generation performance and durability.

The PEFC according to the embodiment and the fuel cell stack using the PEFC can be mounted on a vehicle, for example, as a driving power source.

EXAMPLE

The effects of the present invention will be described with reference to the following Examples and Comparative Examples. However, the scope of the present invention is not limited to the Examples.

Example 1

In this example, Black pearls (registered trademark) 2000 (produced by Cabot) (support A) was used as a support. The support A was produced according to the method disclosed in U.S. Pat. No. 6,398,858.

The pore characteristics of the support A were as follows:

a pore volume, surface area, and average pore radius of micropores were found to be 0.494 cc/g, 1042 $m^2$/g, and 0.47 nm, respectively;

a pore volume, surface area, and average pore radius of mesopores were found to be 1.616 cc/g, 649 $m^2$/g, and 5 nm respectively; and a BET specific surface area was found to be 1444 $m^2$/g.

The resultant support A was used, and platinum (Pt) having an average particle diameter of 3.8 nm as the catalyst metal was supported on the support at a support ratio of 30 wt %, to prepare a catalyst powder A. To be specific, 46 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support A. Next, by filtering and drying, the catalyst powder having a support ratio of 30 wt % was obtained. After that, the resulting product was maintained in a hydrogen ambience at a temperature of 900° C. for 1 hour, to yield a catalyst powder A. The catalyst powder A was tested for pore volumes of micropores and the mesopores before and after the supporting of the catalyst metal. As a result, both decreases in volumes of mesopores and micropores before and after the supporting exceeded 0, and the decrease in volume of mesopores before and after the supporting was larger than the decrease in volume of micropores before and after the supporting.

Example 2

A catalyst powder B was obtained by the same processes as those of Example 1, except that platinum (Pt) having an average particle diameter of 3.9 nm was used instead as the catalyst metal in Example 1. The catalyst powder B was tested for pore volumes of micropores and the mesopores before and after the supporting of the catalyst metal. As a result, both decreases in volumes of mesopores and micropores before and after the supporting exceeded 0, and the decrease in volume of mesopores before and after the supporting was larger than the decrease in volume of micropores before and after the supporting.

Example 3

The support A manufactured by the above-described Synthesis Example 1 was used, a platinum-cobalt alloy having an average particle diameter of 4.1 nm as the catalyst metal was supported on the support A at a support ratio was 30 wt %, to prepare a catalyst powder C. To be specific, 5 g of the support A was immersed into a metal salt solution prepared by dissolving a predetermined amount of Pt dinitrodiamine nitric acid solution ($Pt(NO_2)_2(NH_3)_2$) and a predetermined amount of cobalt chloride ($CoCl_2.6H_2O$) in 100 mL of ion-exchanged water, and the resulting mixture was stirred with a magnetic stirrer. Next, 500 mL of sodium borohydride (SBH) solution having a concentration of 1 wt % was dropped in the mixture, and subjected to reduction treatment under stirring, so that platinum and cobalt were supported on the support A. After that, the support A having platinum and cobalt supported thereon was filtered, washed, and dried, and heat-treated under a hydrogen gas flow at a temperature of 900° C. for 30 minutes, so that an alloy was obtained. The catalyst powder C was tested for pore volumes of micropores and the mesopores before and after the supporting of the catalyst metal. As a result, both decreases in volumes of mesopores and micropores before and after the supporting exceeded 0, and the decrease in volume of mesopores before and after the supporting was larger than the decrease in volume of micropores before and after the supporting.

Comparative Example 1

A comparative catalyst powder D was obtained by the same processes as those of Example 1, except that platinum (Pt) having an average particle diameter of 2.7 nm was used instead as the catalyst metal in Example 1.

Comparative Example 2

A comparative catalyst powder E was obtained by the same processes as those of Example 1, except that platinum (Pt) having an average particle diameter of 4.5 nm was used instead as the catalyst metal and a support B was used instead of the support A in Example 1. In this Example, Ketjen Black EC300J (produced by Lion Corporation) was used as the support B, and pore characteristics of the support B were as follows:

a pore volume and surface area of micropores were found to be 0.286 cc/g and 475 $m^2$/g, respectively;

a pore volume, surface area, and average pore radius of mesopores were found to be 0.637 cc/g, 489 $m^2$/g, and 2.6 nm, respectively; and a BET specific surface area was found to be 796 $m^2$/g. Herein, since a pore diameter distribution was found to be disturbed, an average pore radius of the support B was not able to be measured.

Comparative Example 3

A comparative catalyst powder F was obtained by the same processes as those of Example 3, except that a support C was used instead of the support A in Example 3. In this Example, acetylene black (produced by Denki Kagaku Kogyo Kabushiki Kaisha) was used as the support C, and pore characteristics of the support C were as follows:

a pore volume and surface area of micropores were found to be 0.215 cc/g and 321 m$^2$/g, respectively;

a pore volume, surface area, and average pore radius of mesopores were found to be 0.757 cc/g, 538 m$^2$/g, and 2.8 nm, respectively; and a BET specific surface area was found to be 715 m$^2$/g. Herein, since a pore diameter distribution was found to be disturbed, an average pore radius of the support C was not able to be measured.

The support C was produced according to the method disclosed in JP-A-2009-35598.

The pore volumes, surface areas, and average pore radii of micropores, pore volumes, surface areas, and average pore radii of mesopores, and BET specific surface areas of the supports A to C are summarized in the following Table 1.

TABLE 1

| Support | Micropore | | | Mesopore | | | BET Specific Surface Area (m$^2$/g$^{*2}$) |
|---|---|---|---|---|---|---|---|
| | Average Pore Radius (nm) | Pore Volume (cc/g$^{*1}$) | Surface Area (m$^2$/g$^{*2}$) | Average Pore Radius (nm) | Pore Volume (cc/g$^{*1}$) | Surface Area (m$^2$/g$^{*2}$) | |
| A | 0.47 | 0.494 | 1042 | 5 | 1.616 | 649 | 1444 |
| B | — | 0.286 | 475 | 2.6 | 0.637 | 489 | 796 |
| C | — | 0.215 | 321 | 2.8 | 0.757 | 538 | 715 |

*$^1$Unit of pore volume is cc/g support.
*$^2$Unit of surface area and unit of BET specific surface area are m$^2$/g support.

Example 4

The catalyst powder A manufactured in Example 1 and an ionomer dispersion liquid (Nafion (registered trademark) D2020, EW=1100 g/mol, produced by DuPont) as a polymer electrolyte were mixed at a weight ratio of the carbon support and the ionomer of 0.9. Next, a cathode catalyst ink was prepared by adding a n-propyl alcohol solution (50%) as a solvent with a solid content (Pt+carbon support+ionomer) of 7 wt %.

Ketjen Black (particle diameter: 30 to 60 nm) was used as the support, and platinum (Pt) having an average particle diameter of 2.5 nm as the catalyst metal was supported thereon at a support ratio of 50 wt %, to obtain a catalyst powder. The catalyst powder and an ionomer dispersion liquid (Nafion (registered trademark) D2020, EW=1100 g/mol, produced by DuPont) as the polymer electrolyte were mixed at a weight ratio of the carbon support and the ionomer of 0.9. Next, an anode catalyst ink was prepared by adding a n-propyl alcohol solution (50%) as a solvent with a solid content (Pt+carbon support+ionomer) of 7 wt %.

Next, a gasket (Teonex produced by Teijin DuPont, thickness: 25 μm (adhesive layer: 10 μm)) was arranged around both surfaces of a polymer electrolyte membrane (NAFION NR211 produced by DuPont, thickness: 25 μm). Then, an exposed portion of one surface of the polymer electrolyte membrane was coated with the catalyst ink having a size of 5 cm×2 cm by a spray coating method. The catalyst ink was dried by maintaining the stage where the spray coating was performed at a temperature of 60° C. for 1 minute, to obtain an electrode catalyst layer. At this time, a supported amount of platinum is 0.15 mg/cm$^2$. Next, similarly to the cathode catalyst layer, an anode catalyst layer was formed by spray coating and heat-treatment on the electrolyte membrane, to obtain a membrane electrode assembly (1) (MEA (1)) of this example.

Example 5

A membrane electrode assembly (2) (MEA (2)) was manufactured by the same processes as those of Example 4, except that the catalyst powder B obtained in Example 2 was used instead of the catalyst powder A in Example 4.

Example 6

A membrane electrode assembly (3) (MEA (3)) was manufactured by the same processes as those of Example 4, except that the catalyst powder C obtained in Example 3 was used instead of the catalyst powder A in Example 4.

Comparative Example 4

A comparative membrane electrode assembly (1) (comparative MEA (1)) was manufactured by the same processes as those of Example 4, except that the comparative catalyst powder D obtained in Comparative Example 1 was used instead of the catalyst powder A in Example 4.

Comparative Example 5

A comparative membrane electrode assembly (2) (comparative MEA (2)) was manufactured by the same processes as those of Example 4, except that the comparative catalyst powder E obtained in Comparative Example 2 was used instead of the catalyst powder A in Example 4.

Comparative Example 6

A comparative membrane electrode assembly (3) (comparative MEA (3)) was manufactured by the same processes as those of Example 4, except that the comparative catalyst powder F obtained in Comparative Example 3 was used instead of the catalyst powder A in Example 4.

Experiment 1: Evaluation of Oxygen Reduction Reaction (ORR) Activity

The membrane electrode assemblies (1) to (3) manufactured in Examples 4 to 6 and the comparative membrane electrode assemblies (1) to (3) manufactured in Comparative Examples 4 to 6 were evaluated for oxygen reduction reaction activity by measuring power generation current per surface area of platinum (μA/cm$^2$ (Pt)) at 0.7 V under the following evaluation conditions. With respect to the MEA (3) of Example 6, the evaluation of oxygen reduction reaction activity was performed by repeating the same operation except for changing the voltage from 0.7 V to 0.9 V in the above operation, to measure the power generation current per surface area (μA/cm$^2$ (Pt)).

Figure 6:
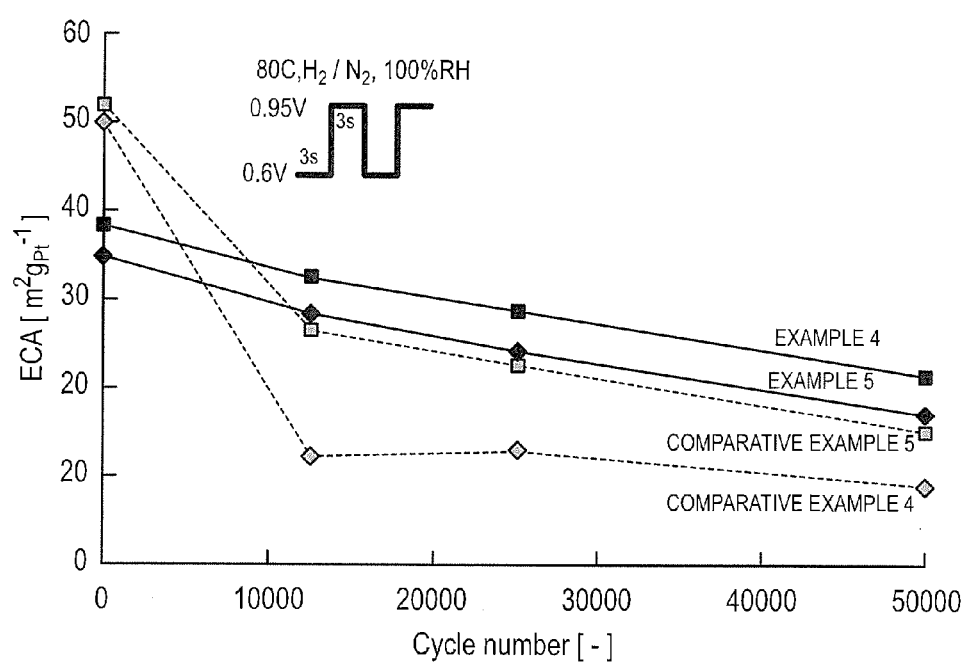
FIG. 6 is a graph illustrating oxygen reduction reaction (ORR) activities of MEAs of Examples 4 and 5 and Comparative Examples 4 and 5.
Figure 7:
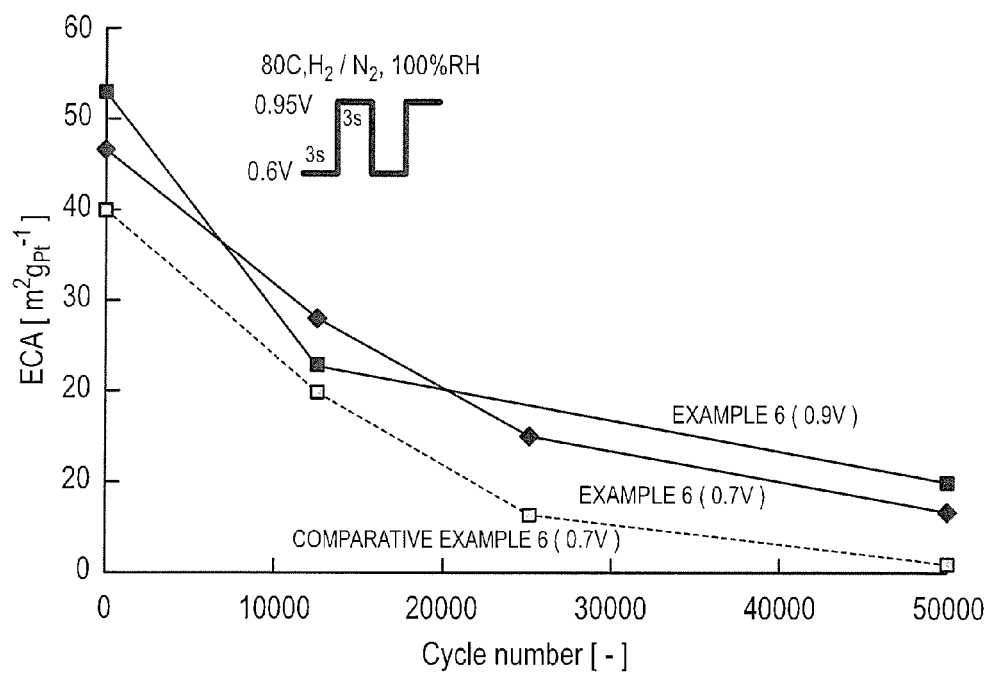
FIG. 7 is a graph illustrating oxygen reduction reaction (ORR) activities of MEAs of Example 6 and Comparative Example 6.

The results are illustrated in FIGS. 6 and 7. In FIG. 7, the oxygen reduction reaction activity of the MEA (3) of Example 6 performed in the case where the voltage is 0.7 V is indicated by rhombus (♦), and the oxygen reduction reaction activity of the MEA (3) of Example 6 performed in the case where the voltage is 0.9 V is indicated by square (■).

[Chem. 2]
<Evaluation Conditions>
Temperature: 80° C.
Gas Component: Hydrogen (Anode Side)/Oxygen (Cathode Side)
Relative Humidity: 100% RH/100% RH
Pressure: 150 kPa(abs)/150 kPa(abs)
Voltage Scan Direction: Anode It was noted from FIG. 6 that the MEAs (1) and (2) using the catalyst according to the present invention showed more excellent catalytic activity (oxygen reduction reaction activity) in comparison to the comparative MEAs (1) and (2). Similarly, it was noted from FIG. 7 that the MEA (3) using the catalyst according to the present invention showed more excellent catalytic activity (oxygen reduction reaction activity) in comparison to the comparative MEA (3). It is presumed that the result can be attained because the detachment of catalyst metals is suppressed and prevented by the presence of mesopores and micropores, particle growth (agglomeration) of platinum or platinum alloy is suppressed by increased particle diameter of catalyst metals due to heat-treatment, and decreased effective surface area (ECA) is suppressed.

The present application is based on the Japanese Patent Application No. 2013-092906 filed on Apr. 25, 2013, the entire disclosed contents of which are incorporated herein by reference.

DESCRIPTION OF REFERENCE SIGNS

1 Polymer electrolyte fuel cell (PEFC),
2 Solid polymer electrolyte membrane,
3 Catalyst layer,
3a Anode catalyst layer,
3c Cathode catalyst layer,
4a Anode gas diffusion layer,
4c Cathode gas diffusion layer,
5 Separator,
5a Anode separator,
5c Cathode separator,
6a Anode gas passage,
6c Cathode gas passage,
7 Coolant passage,
10 Membrane electrode assembly (MEA),
20 Catalyst,
22 Catalyst metal,
23 Support,
24 Mesopore,
25 Micropore,
26 Electrolyte.

The invention claimed is:

1. An electrode catalyst for a fuel cell, comprising:
a catalyst support, having a main component of carbon, and a catalyst metal supported on the catalyst support,
wherein the catalyst support includes pores having a radius of less than 1 nm and pores having a radius in the range of 1 nm to 10 nm,
wherein a surface area formed by the pores having a radius of less than 1 nm is equal to or larger than a surface area formed by the pores having a radius in the range of 1 nm to 10 nm,
wherein an average particle diameter of the catalyst metal is in the range of 3.8 nm to 30 nm,
wherein a larger number of catalyst metals are supported in pores having a radius in the range of 1 nm to 10 nm than in pores having a radius of less than 1 nm,
wherein 50wt % or more of the catalyst metal is supported inside the pores having a radius in the range of 1 nm to 10 nm, and
wherein a pore volume of the pores having a radius of less than 1 nm of the catalyst support is in the range of 0.1 cc/g to 3 cc/g.

2. The electrode catalyst for a fuel cell according to claim 1, wherein the catalyst support has a BET specific surface area in the range of 1100 $m^2$/g support to 3000 $m^2$/g support.

3. The electrode catalyst for a fuel cell according to claim 1, wherein the catalyst metal is platinum or includes platinum and a metal component other than platinum.

4. The electrode catalyst for a fuel cell according to claim 1, wherein the average particle diameter of the catalyst metal is in the range of 4.1 nm to 30 nm.

5. An electrode catalyst layer for a fuel cell, comprising the catalyst set forth in claim 1, and an electrolyte.

6. The electrode catalyst layer for a fuel cell according to claim 5, wherein the catalyst metal is supported inside the pores having a radius in the range of 1 nm to 10 nm such that the catalyst metal is not in contact with the electrolyte.

7. The electrode catalyst layer for a fuel cell according to claim 5, wherein 50% wt or more of the catalyst metal is supported inside the pores having a radius in the range of 1 nm to 10 nm such that the 50% wt or more of the catalyst metal is not in contact with the electrolyte.

8. The electrode catalyst for a fuel cell according to claim 1, wherein the pore volume of the pores having a radius of less than 1 nm of the catalyst support is in the range of 0.3 cc/g to 3 cc/g.

9. The electrode catalyst for a fuel cell according to claim 1, wherein the catalyst metal is an alloy of platinum and cobalt and the average diameter of the catalyst metal is in the range of 4.1 nm to 30 nm.

10. The electrode catalyst for a fuel cell according to claim 1, wherein the catalyst support consists only of carbon atoms.

11. The electrode catalyst for a fuel cell according to claim 1, wherein the catalyst support consists essentially of carbon atoms.

* * * * *